(12) United States Patent
Rotta et al.

(10) Patent No.: US 9,186,018 B2
(45) Date of Patent: Nov. 17, 2015

(54) DISPENSING ASSEMBLY FOR MACHINES FOR THE PREPARATION OF BEVERAGES USING CAPSULES

(71) Applicant: LUIGI LAVAZZA S.p.A., Turin (IT)

(72) Inventors: Denis Rotta, Dronero (IT); Stefano Tornincasa, Turin (IT); Elvio Bonisoli, Turin (IT); Alberto Cabilli, Moncalieri (IT); Luca Bugnano, Moncalieri (IT)

(73) Assignee: LUIGI LAVAZZA S.P.A., Turin (IT)

( * ) Notice: Subject to any disclaimer, the term of this patent is extended or adjusted under 35 U.S.C. 154(b) by 0 days.

(21) Appl. No.: 14/417,347

(22) PCT Filed: Jul. 18, 2013

(86) PCT No.: PCT/IB2013/055920
§ 371 (c)(1),
(2) Date: Jan. 26, 2015

(87) PCT Pub. No.: WO2014/016741
PCT Pub. Date: Jan. 30, 2014

(65) Prior Publication Data
US 2015/0173559 A1    Jun. 25, 2015

(30) Foreign Application Priority Data

Jul. 26, 2012 (IT) .............................. TO2012A0659

(51) Int. Cl.
*A47J 31/36* (2006.01)
*A23F 5/26* (2006.01)

(52) U.S. Cl.
CPC .............. *A47J 31/3638* (2013.01); *A23F 5/26* (2013.01); *A47J 31/3628* (2013.01); *A47J 31/3633* (2013.01)

(58) Field of Classification Search
CPC .............. A47J 31/3628; A47J 31/3633; A47J 31/3638; A23F 5/26
See application file for complete search history.

(56) References Cited

U.S. PATENT DOCUMENTS

| 2006/0075902 A1* | 4/2006 | Magno ............................ 99/279 |
| 2007/0068394 A1* | 3/2007 | Jarisch et al. ................... 99/279 |

(Continued)

FOREIGN PATENT DOCUMENTS

| FR | 2 886 121 | 12/2006 |
| WO | WO 2010/149468 | 12/2010 |
| WO | WO 2012/168918 | 12/2012 |

OTHER PUBLICATIONS

International Search Report for PCT/IB2013/055920, mailed Feb. 5, 2014.

(Continued)

*Primary Examiner* — Anthony Weier
(74) *Attorney, Agent, or Firm* — Nixon & Vanderhye P.C.

(57) ABSTRACT

A dispensing assembly (30) for a machine for the preparation of liquid products using capsules includes: an injector device (50), for introducing into a capsule (10) water and/or steam under pressure; a capsule holder (40), facing the injector device (50) and designed to receive the capsule (10); and an actuation linkage (80), for causing displacements of the capsule holder (40) between a spaced position and a close position with respect to the injector device (50). The dispensing assembly (30) further includes ejector means (70), which are designed to push the capsule (10) towards the outside of the capsule holder (40) according to the displacement of the capsule holder (40) towards its spaced position from the injector device (50). The ejector means (70) are mechanically constrained to the actuation linkage by means of a mechanical connection.

17 Claims, 15 Drawing Sheets

(56) References Cited

U.S. PATENT DOCUMENTS

| | | | |
|---|---|---|---|
| 2008/0121111 A1* | 5/2008 | Paget et al. | 99/295 |
| 2010/0192779 A1* | 8/2010 | Tanner et al. | 99/295 |
| 2012/0000371 A1 | 1/2012 | Blanchino et al. | |
| 2012/0207894 A1* | 8/2012 | Webster et al. | 426/433 |
| 2014/0342069 A1* | 11/2014 | Tinkler et al. | 426/425 |

OTHER PUBLICATIONS

Written Opinion of the International Searching Report for PCT/IB2013/055920, mailed Feb. 5, 2014.

* cited by examiner

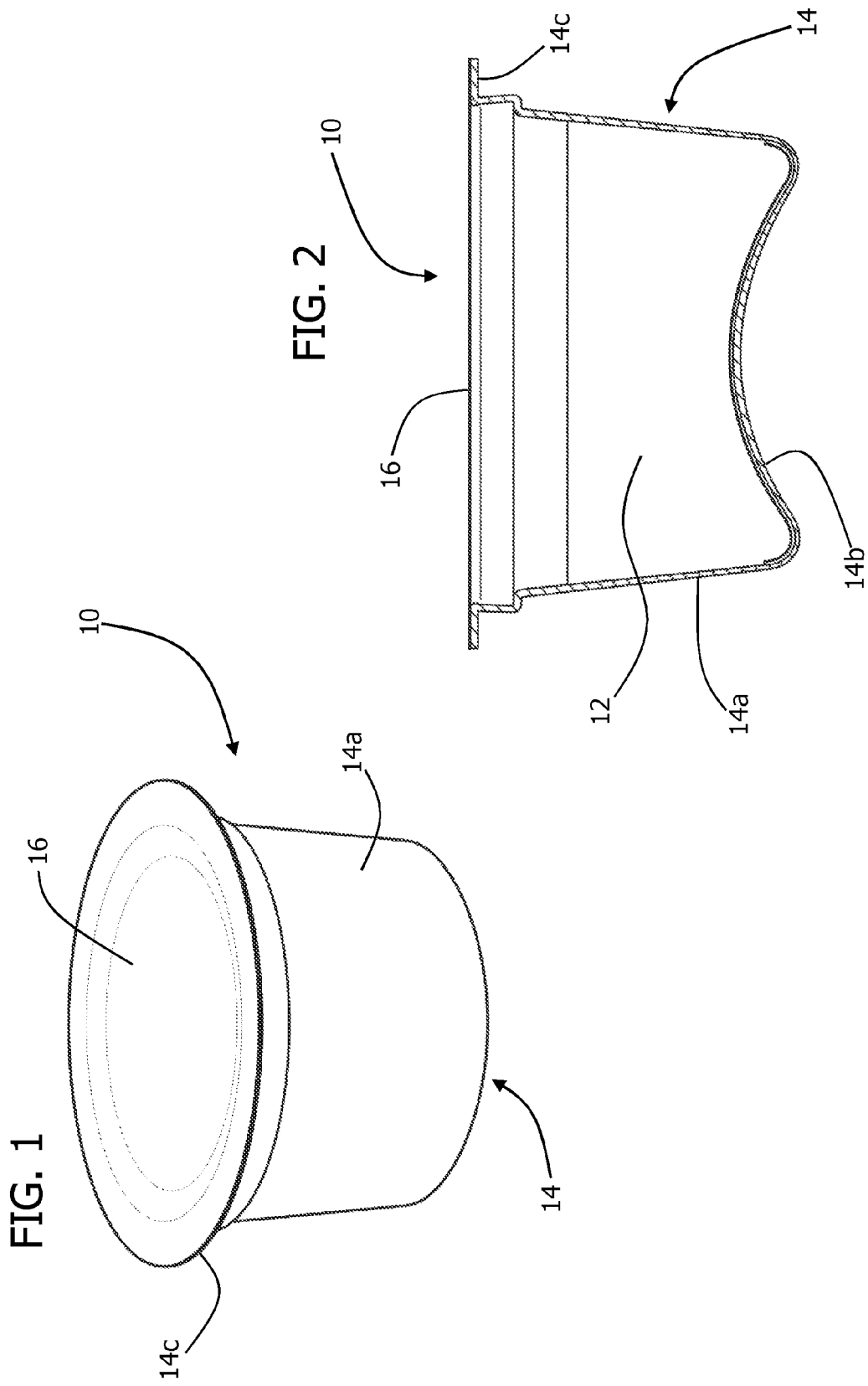

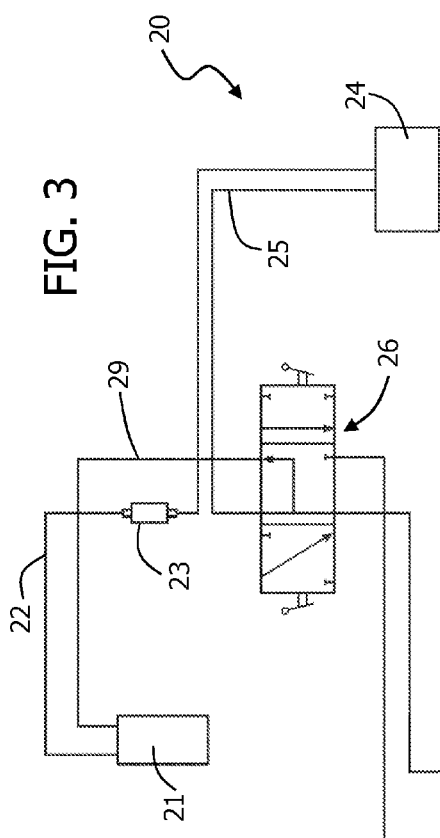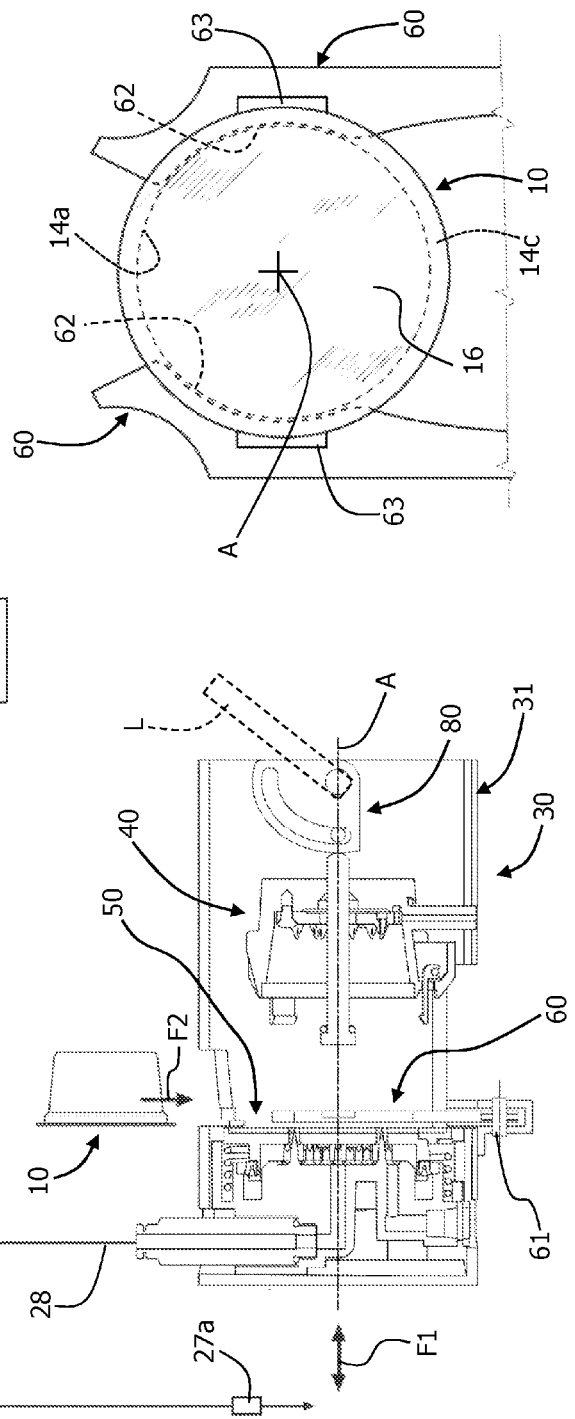

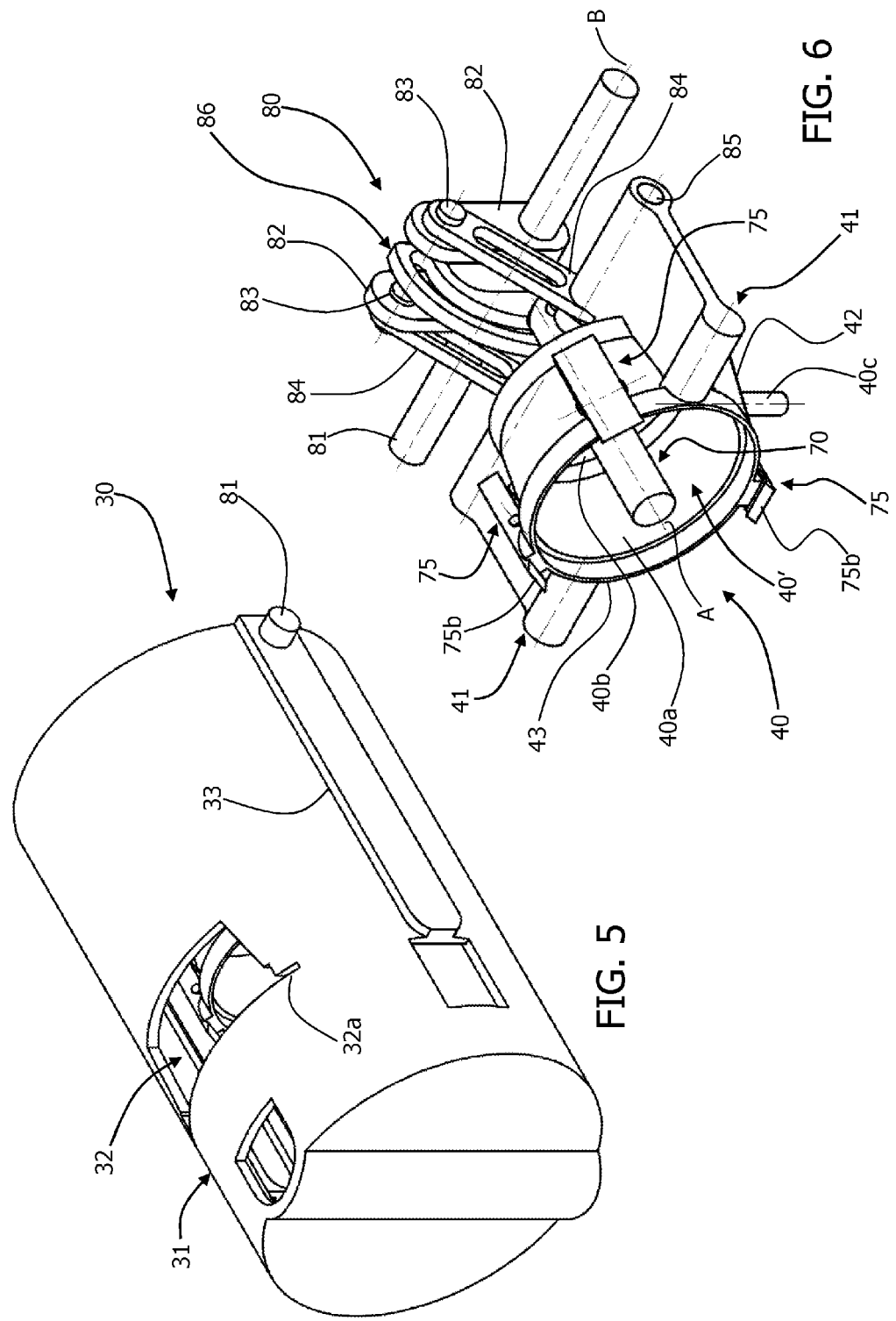

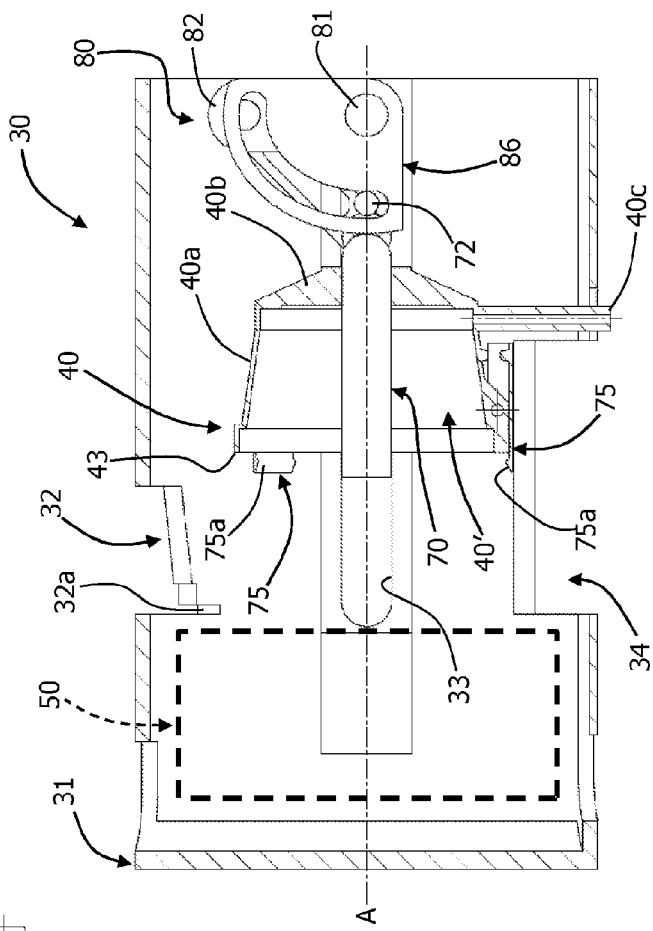
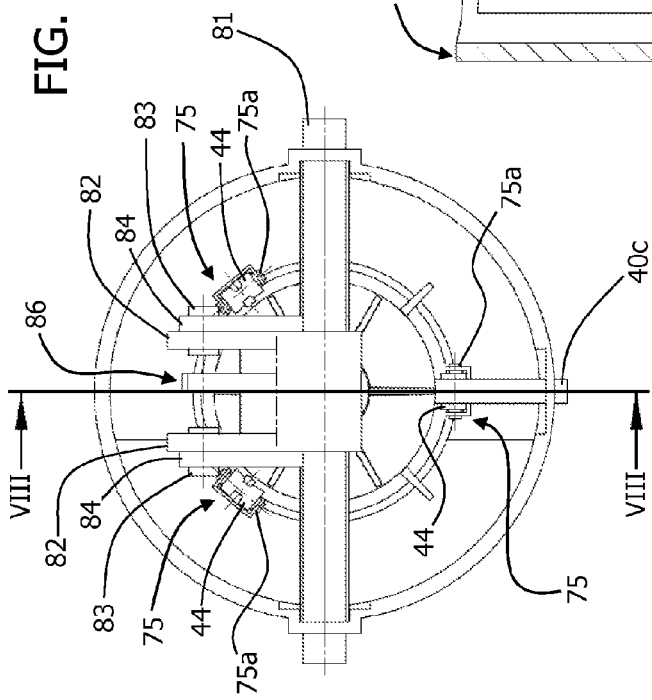

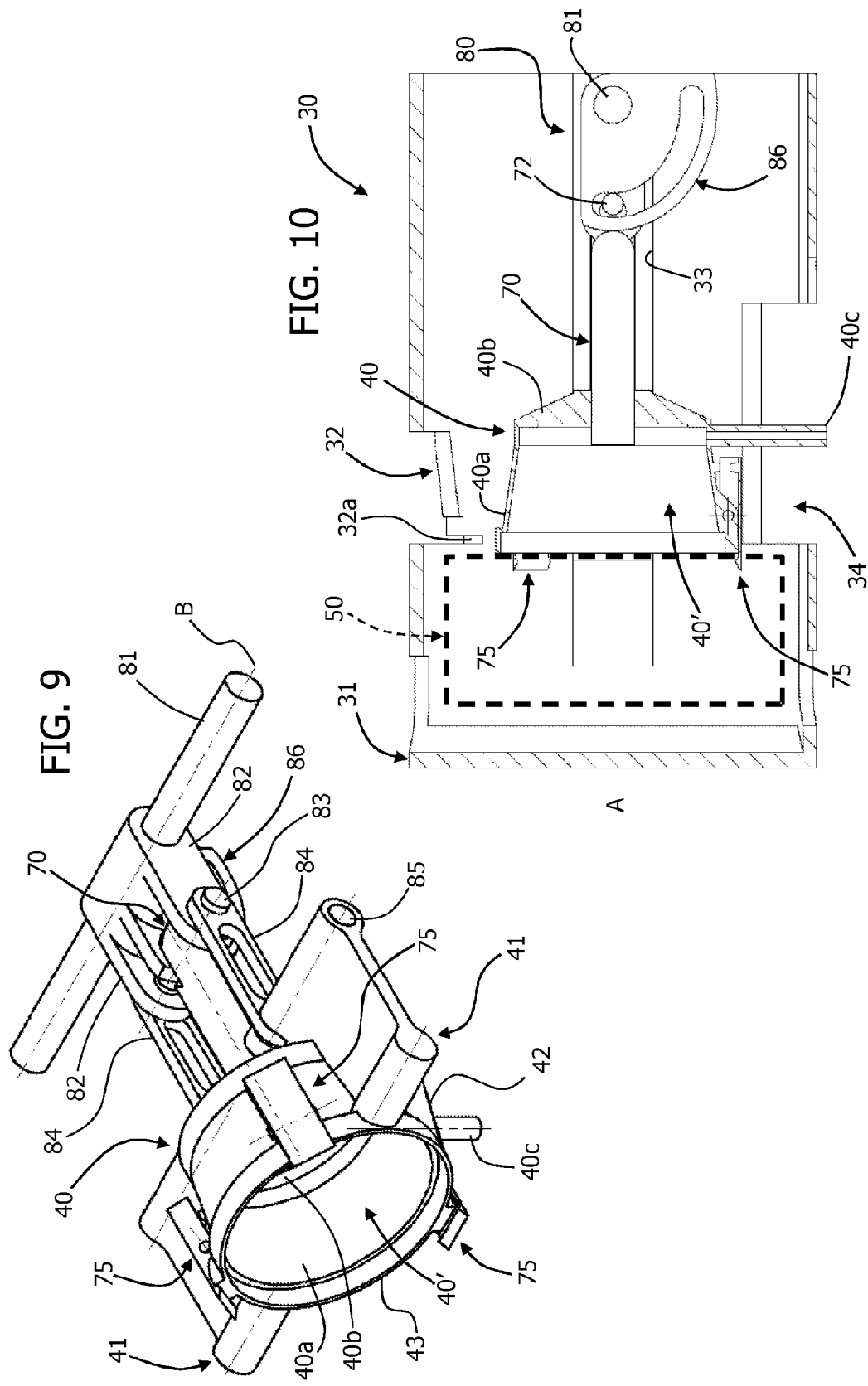

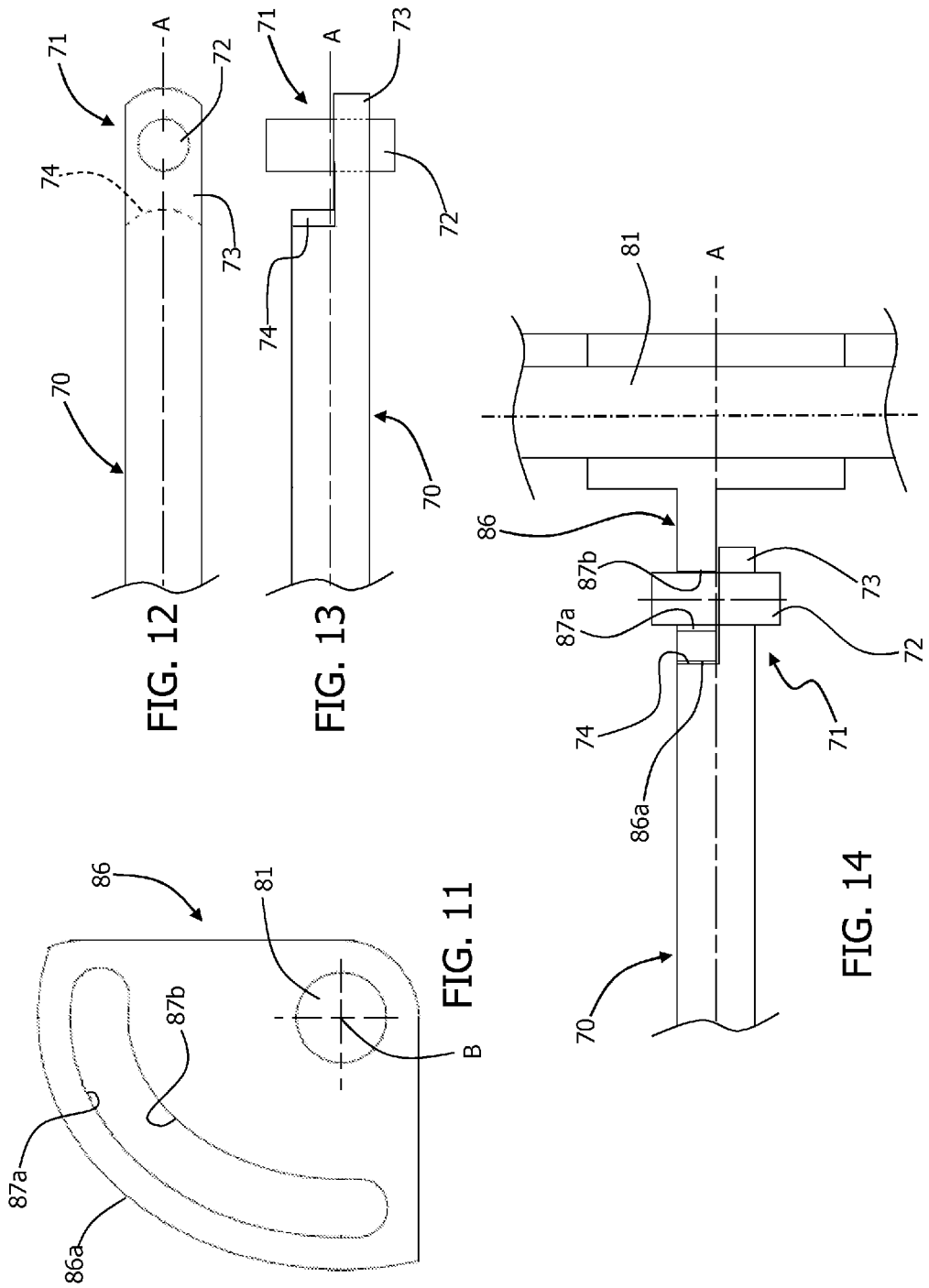

DISPENSING ASSEMBLY FOR MACHINES FOR THE PREPARATION OF BEVERAGES USING CAPSULES

This application is the U.S. national phase of International Application No. PCT/IB2013/055920, filed 18 Jul. 2013, which designated the U.S. and claims priority to IT Application No. TO2012A000659, filed 26 Jul. 2012; the entire contents of each of which are hereby incorporated by reference.

TECHNICAL FIELD

The present description relates to machines, systems, and methods for the preparation of beverages and liquid products in general using capsules. The invention has been developed with particular reference to dispensing assembly for the machines of the type indicated.

PRIOR ART

EP-A-1859713 discloses a dispensing assembly for use in combination to disk-shaped pod made of filter paper, which comprises a pod holder, which can be translated by means of a transmission including a pair of gears having a non-circular cross section. The assembly includes an ejector member, slidably mounted in an opening of the bottom wall of the pod holder, designed to apply a force of ejection on the pod in order to eject it from the pod holder. In order to co-ordinate the movement of the ejector member with that of the pod holder, the member itself is operated by means of the gear transmission: for this purpose, the rear end of the ejector member is able to co-operate with the surface of a non-toothed stretch of one of the gears of the aforesaid transmission in order to pass from an advanced position to a retracted position with respect to the bottom of the pod holder, in the course of a movement of approach of the pod holder with respect to a stationary part of the infusion chamber. In the course of a subsequent reverse movement of the pod holder, the latter draws along with it the ejector member in order to bring back the rear end into contact with the aforesaid surface. The prior solution is relatively complex, in relation to the modalities of actuation of the ejector member.

OBJECT AND SUMMARY

In its general terms, the aim of the present invention is to provide an improved and compact dispensing assembly that is simple from the constructional standpoint, convenient to use for a user and distinguished by high reliability, above all in relation to the function of extraction of an exhausted capsule from the capsule holder.

According to the invention, the above objects are achieved thanks to a dispensing assembly for machines for the preparation of beverages and liquid products in general having the characteristics recalled in claim 1. The invention moreover regards a system and a method for the preparation of beverages using the dispensing assembly of claim 1. Advantageous developments of the invention form the subject of the dependent claims. The claims form an integral part of the technical teaching provided herein in relation to the invention.

BRIEF DESCRIPTION OF THE FIGURES

The invention will now be described, purely by way of non-limiting example, with reference to the annexed drawings, in which:

FIGS. 1 and 2 are a perspective view and a cross-sectional view, respectively, of a generic sealed capsule that can be used in a dispensing assembly according to the present invention;

FIG. 3 is a schematic representation, in part by means of functional blocks and in part in cross section, of a possible embodiment of a machine for the preparation of liquid products using a dispensing assembly according to the present invention;

FIG. 4 is a partial and schematic front view of a possible embodiment of a capsule-retention system belonging to a dispensing assembly according to the invention;

FIG. 5 is a schematic perspective view of a possible embodiment of a dispensing assembly according to the invention;

FIG. 6 is a schematic perspective view of a part of the assembly of FIG. 5, in a first position;

FIG. 7 is a view in rear elevation of the assembly of FIG. 5;

FIG. 8 is a schematic cross section according to the line VIII-VIII of FIG. 7;

FIGS. 9 and 10 are views similar to those of FIGS. 6 and 8, but with the assembly in a second position;

FIG. 11 is a schematic side view of a movable member belonging to a mechanical connection between an ejector stem and an actuation linkage of the assembly of FIG. 5;

FIGS. 12 and 13 are schematic views, respectively a side view and a top plan view, of a rear end portion of an ejector stem of the assembly of FIG. 5;

FIG. 14 is a schematic cross section aimed at illustrating coupling between the member of FIG. 11 and the ejector stem of FIGS. 12-13;

DESCRIPTION OF PREFERRED EMBODIMENTS OF THE INVENTION

Figure 15:
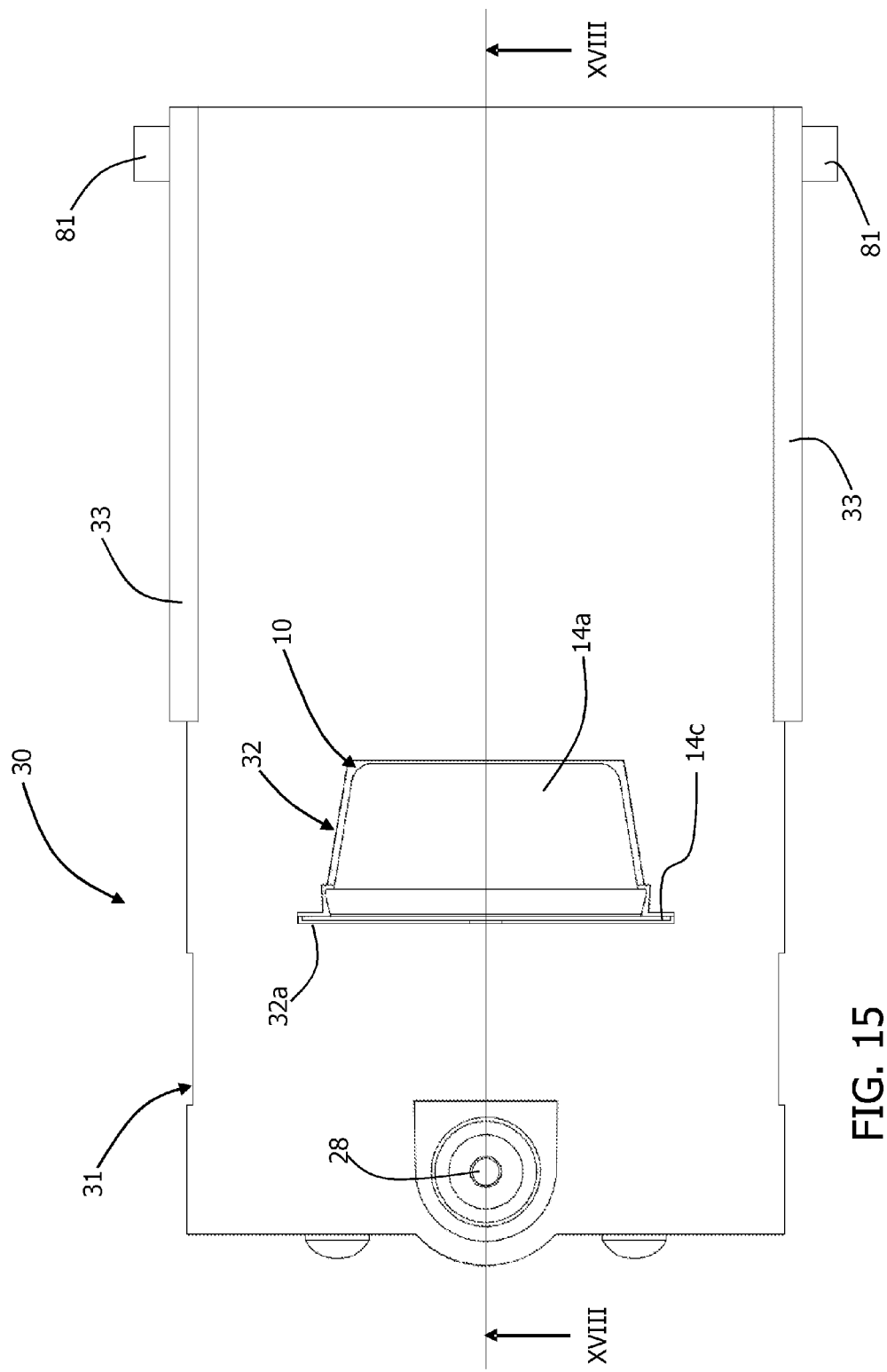
FIGS. 15 and 16 are a schematic top plan view and a schematic view in side elevation, respectively, of a dispensing assembly according to the invention in a preferred embodiment, in a first condition.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Moreover, particular conformations, structures or characteristics may be combined in any adequate way in one or more embodiments. The references used herein are provided merely for convenience and hence do not define the sphere of protection or the scope of the embodiments.

FIGS. 1 and 2 illustrate, merely by way of example, a capsule (also referred to as "cartridge") that can be used in a machine according to the present invention. This capsule, designated as a whole by 10, is of a type basically known and is described herein merely to facilitate understanding of one embodiment of the present invention.

The capsule 10 contains a dose 12 of at least one substance that can form a liquid product using water and/or steam. The dose 12 may be constituted by powdered coffee, or by another precursor of a liquid product, such as, for example, a beverage, tea, powdered chocolate, or chocolate in granular form, products for the preparation of broths, soups, drinks, and infusions of various nature. This list is to be understood as merely providing a non-imperative example. In what follows, for simplicity, reference will be made to the preparation of coffee, with the dose 12 that is thus understood as being constituted by powdered coffee. In the structure of the capsule 10, which is as a whole shaped substantially like a tray or small cup in which the dose 12 is located, there may be distinguished:
- a body 14, comprising a side or peripheral wall 14a and a bottom wall 14b that closes the body 14 at one end of the side wall 14a; and
- a closing wall 16 that closes the capsule 10 at the opposite end with respect to the bottom wall 14b.

In the example illustrated, the capsule 10 is a hermetically closed capsule, with the wall 16 that is constituted by a sealing lamina. The body of the capsule 10 is generally semirigid, preferably made of moulded plastic material, for example with a polypropylene base, whereas the wall 16 is constituted by a flexible sheet material, for example with an aluminium base. The invention may in any case be used also in combination with capsules formed with other materials and/or capsules in which the bottom wall and/or the closing wall are provided with holes.

In the example, the wall or lamina 16 is connected in a fluid-tight way, for example, by heat sealing, to the side wall 14a of the body 14 of the capsule, in particular at an outer annular flange 14c thereof, which surrounds the mouth part of the body 14. The capsule 10 consequently has an asymmetrical shape with respect to a plane passing through the flange 14c.

In the case exemplified, the body 14 is shaped like a cup or tray diverging from the bottom wall 14b towards the end closed by the sealing lamina 16. Preferably, this diverging conformation is frustoconical, even though this is not imperative in so far as the capsule 10 may as a whole present different shapes, for example, cylindrical, prismatic, frusto-pyramidal, etc. In the non-limiting example represented, the bottom wall 14b is shaped like a concave vault, with the concavity of the aforesaid vault directed towards the outside of the capsule 10. Also in this case, the choice of the above conformation is not imperative in so far as the capsule 10 could have, for example, a bottom wall 14b shaped like a vault with its concavity facing the inside of the capsule 10, or else a bottom wall 14b that is plane or substantially plane.

Represented schematically and merely by way of non-limiting example in FIG. 3 is a machine for the preparation of liquid products that uses a dispensing assembly according to the invention, designed to use a capsule, for example, a capsule of the type described above with reference to FIGS. 1 and 2.

The machine, designated as a whole by 20, comprises a reservoir 21 for cold water, with an outlet duct 22, operative on which is a pump 23, of a type in itself known, for example, an electromagnetic pump. Via the duct 22 the reservoir 21 is connected to an inlet of a boiler 24, which is also of a type in itself known. An outlet of the boiler 24 is connected to a duct 25 for supplying hot water and/or steam under pressure to an inlet of a distributor device, for example, a sliding distributor designated by 26. When the distributor 26 is in a first operative position (towards the right, as viewed in FIG. 3), it sets the duct 25 in communication with a duct 27 that supplies a nozzle 27a for dispensing hot water and/or steam. When, instead, the distributor 26 is in a second operative position (to the left, as viewed in FIG. 2), the duct 25 is set in fluid communication with a duct 28 for supplying hot water under pressure to a dispensing assembly, designated as a whole by 30. In various embodiments, the dispensing assembly 30 is a dispensing assembly that extends as a whole according to a horizontal axis A. Finally, when the distributor 26 is located in an inoperative position (at the centre, as illustrated in FIG. 3), the duct 25 is in fluid communication with a duct 29 for return of water to the reservoir 21.

In various embodiments, the dispensing assembly 30 has a supporting structure or casing 31, in which an infusion chamber is located comprising a first part 40 and a second part 50, of which at least one is movable with respect to the other. In the example illustrated, the first part 40 includes a capsule holder, defining a chamber designed to house at least partially a capsule and deliver the liquid product obtained using the capsule, as will emerge from what follows. The capsule holder 40, which is substantially coaxial with axis A, comprises a cup-shaped body, mounted movable with respect to the casing 31. The second part 40 of the infusion chamber of the dispensing assembly 30 illustrated comprises an injector device, referred to hereinafter for simplicity as "injector", designed to introduce into a capsule water and/or steam under pressure, supplied through the duct 28. In the example illustrated, the injector 50 is substantially coaxial with the axis A and preferably, but not necessarily, is mounted in a stationary position with respect to the casing 31. In embodiments not represented, the injector 50 may be movable, in order to obtain an approach between the injector itself and the capsule holder 40. Preferably associated to the injector 50 is a one-way valve (not represented), designed to open only when the pressure within the duct 28 has reached a pre-set value; a valve of this sort can be integrated within the injector 50 or else be arranged outside it.

It should be noted that, in possible variant embodiments (not illustrated), the function of injection of the fluid into the capsule may be provided in the first part 40 of the infusion chamber, and the function of dispensing the liquid product may be provided in the second part 50 of the infusion chamber.

The assembly 30 preferably includes an arrangement for loading a capsule 10, which comprises an inlet passage and retention means, which are able to assume a condition where they retain a capsule and a condition where they release a capsule. Preferably, the aforesaid means are also configured so as to guide the capsule up to the aforesaid position of retention. As will emerge clearly hereinafter, in a preferred embodiment, switching of the aforesaid retention means between the two conditions referred to above is determined by the relative movement between the capsule holder 40 and the injector 50. In the example illustrated, the aforesaid switching between the retention condition and the release condition is determined by the mechanical interaction or interference between elements or parts of the capsule holder 40 and the retention means themselves.

With reference also to FIG. 4, in a preferred embodiment, the aforesaid retention means comprise two jaw elements 60, defined hereinafter for simplicity as "jaws". The jaws 60 are arranged substantially symmetrically on opposite sides of the axis A, in one and the same transverse plane. In the case exemplified, the arrangement of the jaws 60 is conceptually similar to the one described in WO 2006/005736. In this case, the jaws 60 extend in length substantially perpendicular to the axis A and are articulated via at least one pin 61 (FIG. 3), here parallel to the axis A and fixed with respect to the casing 31 or to the body of the injector 50. The jaws 60 may be provided with springs or similar elastic means, not visible, for example mounted at the corresponding hingepins, arranged for pushing the jaws themselves towards a position of equilibrium, visible in FIG. 4, in particular a position for retaining a capsule. In other embodiments, the aforesaid position is obtained without the aid of dedicated springs, and the intrinsic elasticity of the material constituting the jaws for example, a plastic material is exploited to enable a divarication thereof. In the non-limiting example shown, the jaws 60 are articulated in an upper region thereof, but obviously they may be articulated in other regions, for example in the lower region.

In one embodiment, the jaws 60 are shaped so as to define between them a seat 62, in particular a substantially cylindrical lower seat, substantially coaxial with the axis A. The non-limiting arrangement exemplified is such that, in the course of the phase of loading from above, a preferably cylindrical part of the capsule 10, set behind the annular flange 14*c* (see, for example, FIG. 2), penetrates between the jaws 60, causing divarication thereof countering the action of the corresponding springs (or the intrinsic elasticity of the material constituting the jaws), until the seat 62 is reached. In this condition, the capsule 10 is elastically withheld by the jaws 60, in a position substantially coaxial with the axis A and intermediate between the injector and the capsule holder. In other embodiments (not represented), the seat and jaws may be provided in such a way that reaching and maintaining the aforesaid position by the capsule 10 is achieved in the absence of an elastic stress on the jaws themselves: in such a case, the presence of possible elastic means and/or the intrinsic elasticity of the material constituting the jaws 60 is exploited to enable divarication thereof and subsequent return to the position of equilibrium.

The body of each jaw 60 is shaped in particular in its part facing the capsule holder 40 so as to interact with parts of the capsule holder 40 in order to obtain a divarication of the jaws themselves: for this purpose, for example, the body of the jaws 60 may be provided with corresponding lead-ins or inclined planes, or present projections designed to co-operate with corresponding parts, such as lead-ins or inclined planes, present on the capsule holder 40.

The retaining means of the assembly 30 according to the invention may also have a conformation different from the one exemplified, provided that the general function of retaining a capsule 10 in an intermediate position substantially coaxial with the capsule holder 40 and the injector 50 is preserved. For example, the retaining means could be also carried directly by the capsule holder 40, for instance in the form of jaws or arms projecting from a front of the latter, which are designed to divaricate following upon interaction with the body of the injector 50. Moreover, the intermediate position of retention of the capsule by the retention means does not necessarily have to share the axis A. In the above intermediate position, in fact, the axis of the capsule could even be parallel or slightly inclined with respect to the axis A: in such a variant embodiment the conicity of the peripheral wall of the capsule and of the chamber defined in the capsule holder 40 may be exploited to obtain a relative movement of centring between the elements in question, during advance of the capsule holder, as clarified hereinafter.

FIGS. 5-10 represent a dispensing assembly 30, with some of its components. It should be noted that these figures are merely schematic, in so far as they are principally aimed at illustrating the modes of operation of an ejector system of the assembly 30: for this reason, for example, in FIGS. 5-10 the representation of certain details, such as the jaws 60 and the injector 50, has been omitted. Visible in FIG. 5 is the assembly 30, and especially its casing 31, here having an approximately cylindrical shape. In its upper part the casing 31 has an introduction opening 32, forming part of the arrangement for loading the capsules. In the example, the profile of the opening 32 is substantially complementary to the cross section of the capsules 10 so as to enable guided introduction thereof into the assembly 30 with relative precision. In this perspective, for example, the opening 32 preferably defines guide slits 32*a* for the flange 14*c* of the capsules 10. In the loading phase, after passing beyond the opening 32, the capsule 10 is taken up by the jaws 60 (FIG. 4), as described previously.

Defined on each of the two opposite sides of the casing 31 is a linear guide, one of which is designated by 33. Engaged in the two guides 33, which are parallel to one another and to the axis A, are respective elements for lateral guide of the capsule holder 40, visible in FIG. 6, where the guide elements are designated by 41. The capsule holder 40 hence has parts or elements configured for causing divarication of the jaws 60 during its advance towards the injector. In the example of embodiment illustrated, and as may be seen in particular in FIG. 6, two front parts 42 of the capsule holder 40 are provided for this purpose (just one of which is visible in the figure), which are opposite to one another and each define at least one respective inclined plane. The inclined planes of the parts 42, which are preferably generally convergent in the direction of the injector, are designed to interact with corresponding lead-ins or inclined planes defined on each jaw 60 so as to cause divarication thereof (reference 63, FIG. 4).

Visible in FIGS. 6 and 8 is an example of the cup-shaped body of the capsule holder 40, defining a corresponding housing 40'. For this purpose, the cup-shaped body has a side or peripheral wall 40*a*, which defines an internal surface of the housing 40' which is substantially frustoconical or of some other shape congruent with the one of the side wall of the capsules used. The cup-shaped body of the capsule holder 40 has a bottom wall 40*b* and a bottom passage 40*c*, which sets the inside of the housing 40' in fluid communication with a duct (not represented) for dispensing the liquid product that can be obtained by means of a capsule, i.e., in the example considered herein, an infusion of coffee.

As will emerge clearly also from what follows, to the bottom wall 40*b* there may be associated a perforation device (not represented herein), set inside the housing 40' and comprising one or more tips or reliefs. Irrespective of the specific conformation of a device of the above sort, the arrangement is such that the liquid that flows out of the capsule 10, torn at the bottom by the aforesaid tips, can reach the passage 40*c*. The latter may be connected, for example via a flexible pipe or a rigid coupling with a number of mated profiles, to a nozzle for dispensing the liquid product. On the other hand, the invention may be applied also to the case of dispensing units for capsules having a pre-perforated bottom wall, or for capsules made of filter paper, in which case it is not necessary to envisage a perforation device inside the capsule holder 40.

The bottom wall 40*b* of the capsule holder 40 is traversed by a passage substantially coaxial with the axis A, slidably mounted in which is a longitudinally extended ejector member. In the example shown, the ejector member is configured as rod or stem, designated as a whole by 70, having a preferably cylindrical cross section. The stem 70 also passes through a central opening of the supporting wall of the aforesaid perforation device inside the capsule holder 40, when such a perforation device is provided.

In its mouth part the housing 40' is limited by an annular front edge, designated by 43. As may be seen in FIGS. 6-8, substantially in the proximity of the aforesaid edge 43, mounted on the peripheral wall 40*b* of the cup-shaped body are coupling members 75, which are substantially jaw-shaped.

In the example, three coupling members 75 are provided arranged at approximately at 120° from one another, of which at least one is preferably positioned in the lower area of the capsule holder 40. As will emerge from what follows, the members 75 form part of a system aimed at facilitating separation of a capsule 10 from the injector 50, in a discharge step of the cycle of use of the assembly.

In a possible embodiment, at the members 75 the peripheral wall 40*a* of the capsule holder 40 has external appendages 44 (FIG. 7), to which a corresponding member 75 is constrained via a pin 75*a* set in a transverse direction with respect to the axis A. The coupling member 75 is preferably elastically urged into a closing position towards the axis A, the elastic stress being obtainable, for example, by a spring or some other accumulator of mechanical energy. In other embodiments, the aforesaid closing position is obtained without the aid of dedicated means, and the intrinsic elasticity of the material constituting the member 75—for example, a plastic material—is exploited to enable divarication thereof. The member 75 may even be formed integral with the body of the capsule holder 40. The members 75 may be pre-arranged in such a way that the closing position thereof is obtained in the absence of any elastic stress: in a case of this sort, the presence of possible elastic means and/or the intrinsic elasticity of the constituent material is exploited for enabling opening or divarication of the members 75 and subsequent return thereof to the closing position.

The coupling members 75 have, in the respective front region, a respective tooth 75*b*. As may be noted, the front region of the coupling members 75, inclusive of the teeth 75*b*, projects at the front beyond the front edge 43 of the capsule holder 40.

The displacement of the capsule holder 40 in the two opposite directions indicated by the arrow F1 of FIG. 3 is obtained by means of an actuation linkage, designated as a whole by 80. In various embodiments, such as the one exemplified hereinafter, the actuation system 80 comprises a mechanism substantially of the toggle or conrod-rocker type, which may be, for example, actuated manually by a user via a purposely provided lever, schematically represented only in FIG. 3, where it is designated by L. In other embodiments, the actuation linkage may include gears.

In the example, and with particular reference to FIG. 6, the aforesaid mechanism includes a shaft 81, which extends between the two opposite sides of the casing 31, and is rotatable about an axis B substantially perpendicular to the direction of displacement of the capsule holder 40, here coinciding with the axis A.

The casing 31 defines passages—with bearing members or the like possibly associated thereto—for the end regions of the shaft 81, which project on the outside of the casing itself, as may be clearly seen, for example, in FIGS. 5 and 7. To the aforesaid projecting ends of the shaft 81 there may be constrained the actuation lever L mentioned previously.

Fitted on the shaft 81 or in any case fixed in rotation with respect thereto are two parallel rockers 82. Articulated to the distal ends of the rockers 82, by means of respective pins 83, are the first ends of two connecting rods 84, the second ends of which are articulated, via a pin 85, to the body of the capsule holder 40. In the non-limiting example illustrated, the opposed guide elements 41 of the capsule holder each define a seat rear for the pin 85. The front part of the guide elements 41 is here generally rounded, with dimensions such as to be able to engage with the linear guides 33 with minimal play.

Starting from the retracted position of the capsule holder 40, visible in FIGS. 6 and 8, the actuation system 80 is actuated by causing—for example with the manual lever L—a counterclockwise rotation of the shaft 81. This rotation may of course be obtained also in an automated way, for example by providing the assembly with a controllable electric actuator, in which case the lever L is not indispensable. This rotation determines the counterclockwise movement of the rockers 82, and hence a thrust forwards of the capsule holder 40 by means of the connecting rods 84. As has been said, in the example considered, the capsule holder 40 is constrained to the linear movement on opposite sides, thanks to engagement of the elements 41 in the guides 33: in this way, it is possible to bring about approach of the capsule holder 40 to the injector 50. Then, by causing a rotation in a clockwise direction of the pin 81, it is possible to obtain an opposite displacement, i.e., a recession of the capsule holder 40, away from the injector 50.

According to the present invention, the ejector member represented by the stem 70 is mechanically connected to the actuation linkage 80 via a mechanism that constrains the stem to the actuation linkage 80 both during passage from the spaced position to the close position of between capsule-holed and injector, and during the opposite passage, from the close position to the spaced position.

The mechanical-connection mechanism is configured in such a way that, during passage from the spaced position to the close position, the stem 70 assumes a position with respect to the bottom 40*b* of the capsule holder 40 such as not to interfere with insertion of a capsule into the housing 40', whereas during passage from the close position to the spaced position, the stem 70 assumes a position with respect to the bottom 40*b* of the capsule holder 40 such as to cause ejection of the capsule from the housing 40'.

Preferably, the mechanical connection between the stem 70 and the linkage 80 is substantially a connection of a desmodromic type, i.e., such that the stroke of the stem 70 is guided or constrained in both directions of actuation of the linkage or of displacement of the capsule holder 40 (forward movement and backward movement) and such that it does not imply the use of springs or other elements for storing mechanical energy. The aforesaid coupling preferentially comprises at least one member that is angularly movable with a movable element of the linkage 80.

In the preferred embodiment, in the passage of the capsule holder 40 between the spaced position and the close position, the stem 70 remains substantially stationary or performs slight constrained forward or backward displacements with respect to the injector 50 of negligible degree, in any case of a degree much smaller than the displacements performed by the capsule holder 40. In more general terms, the connection mechanism is parametrized as a function of the stroke programmed for the stem 70.

In the embodiment represented, the aforesaid coupling comprises at least one cam member 86, fixed with respect to the shaft 81 of the linkage 80, and at least one cam follower 71 associated to the stem 70, which is designated as a whole by 71 in FIGS. 12-14. In the non-limiting example represented, the cam member 86 is in a position intermediate with respect to the cranks 82.

The cam member 86 thus defines at least one cam surface built in a parametric way as a function of a stroke programmed for the stem 70. For this purpose, in the non-limiting example shown, each cam surface has a stretch that is at least approximately arched so as to obtain a minimal, practically negligible, stroke of the stem 70.

Preferably, the cam member 86 has at least two of the aforesaid cam surfaces, very preferably designed to operate in a concurrent way, with the cam follower 71, which is designed to co-operate with at least one of the cam surfaces in the course of displacement of the capsule holder 40 from the spaced position to the close position with respect to the injector 50, and to co-operate with at least another cam surface in the course of displacement of the capsule holder 40 from the close position to the spaced position with respect to the injector 50.

In the example of FIG. 11, the cam member 86 has a slit 87, here at least approximately arched, which defines two cam surfaces 87a and 87b that are generally but not necessarily parallel to one another. It should on the other hand be noted that, in the example shown, the cam member 86 has a front profile which is also generally arched, designated by 86a, which may itself constitute a cam surface that is able to co-operate with the cam follower 71 of the stem 70.

With reference to the example shown in FIGS. 12-14, the cam follower 71 of the stem 70 comprises a projecting pin 72, which is preferably at least in part cylindrical, set substantially parallel to the shaft 81, and engaged in the slit 87. In a preferred embodiment, in the region of its rear end, the stem 70 has a semi-cylindrical portion 73, or in any case one with a restricted cross section, projecting from the plane face of which is the pin 72. The rear region of the stem 70 may even be substantially fork-shaped, with the pin 72 that extends between the two arms of the fork. The pin 72 may be defined directly by the body of the stem 70 or else be inserted in a through opening thereof, as in the case illustrated. Once again with reference to the example illustrated, the body of the stem 70, in its part facing the pin 72 and opposite to the semi-cylindrical portion 73, preferentially has a rounded profile 74. The conformation of the cam follower could in any case differ from the one exemplified.

In FIGS. 6 and 8, the capsule holder 40 is illustrated in its retracted (backward) position. As may be appreciated, by rotating the shaft 81 in the counterclockwise direction, the mechanism 80 enables advance of the capsule holder 40 into the advanced position (see FIGS. 9-10). In the course of the angular movement of the shaft 81 and of the cam member 86, the surface 87b of the latter tends to co-operate with the pin 72, in the direction of advance thereof towards the injector 50: however, by virtue of the profile of the cam surface 87b, the stem 70 remains substantially stationary. In the example, the profile of the surface 87b is not shaped perfectly like the arc of a circumference, so that the pin 72 performs in effect a movement of advance, which is, however, of negligible degree and in any case much less than the displacement performed by the capsule holder 40. It should be noted that, during the counterclockwise rotation of the shaft 81, the same effect just described may be obtained by the interaction between the front surface 86a of the cam member 86 with the rounded profile 74 of the stem 70, the latter being thus able themselves to function as cams and cam follower, respectively.

During a subsequent clockwise rotation of the shaft 81 and of the cam member 86, it is the surface 87a of the latter that tends to co-operate with the pin 72, in the sense of getting it to recede: once again, by virtue of the profile of the surface 87a, the stem 70 remains substantially stationary or, as has been said, performs a backward movement of a negligible degree, in any case decidedly less than the displacement performed by the capsule holder 40.

From a comparison between FIGS. 8 and 10 it will thus be appreciated that, in the retracted and advanced positions of the capsule holder 40, the stem 70—albeit remaining substantially stationary—assumes with respect to the bottom 40b of the capsule holder 40 two different operating conditions, which enable ejection and loading of a capsule 10 from/into the housing 40', respectively.

Overall operation of an assembly 30 according to the invention will now be described with reference to FIGS. 15-23, in which the same reference numbers as those of the previous figures are used to designate elements technically equivalent to the ones described above.

It should be noted that the assembly 30 of FIGS. 15-23 differs from the one illustrated previously for some details, such as the shape of the guide elements 41, of the divaricating elements 42, or of the coupling members 75, the basic function thereof remaining the same. It should moreover be noted that, for greater clarity of the drawings, in some of the figures the representation of some details has been omitted, such as the linear guides 33 or elements of the mechanism 80, which are not indispensable for an understanding of the invention.

Figure 16:
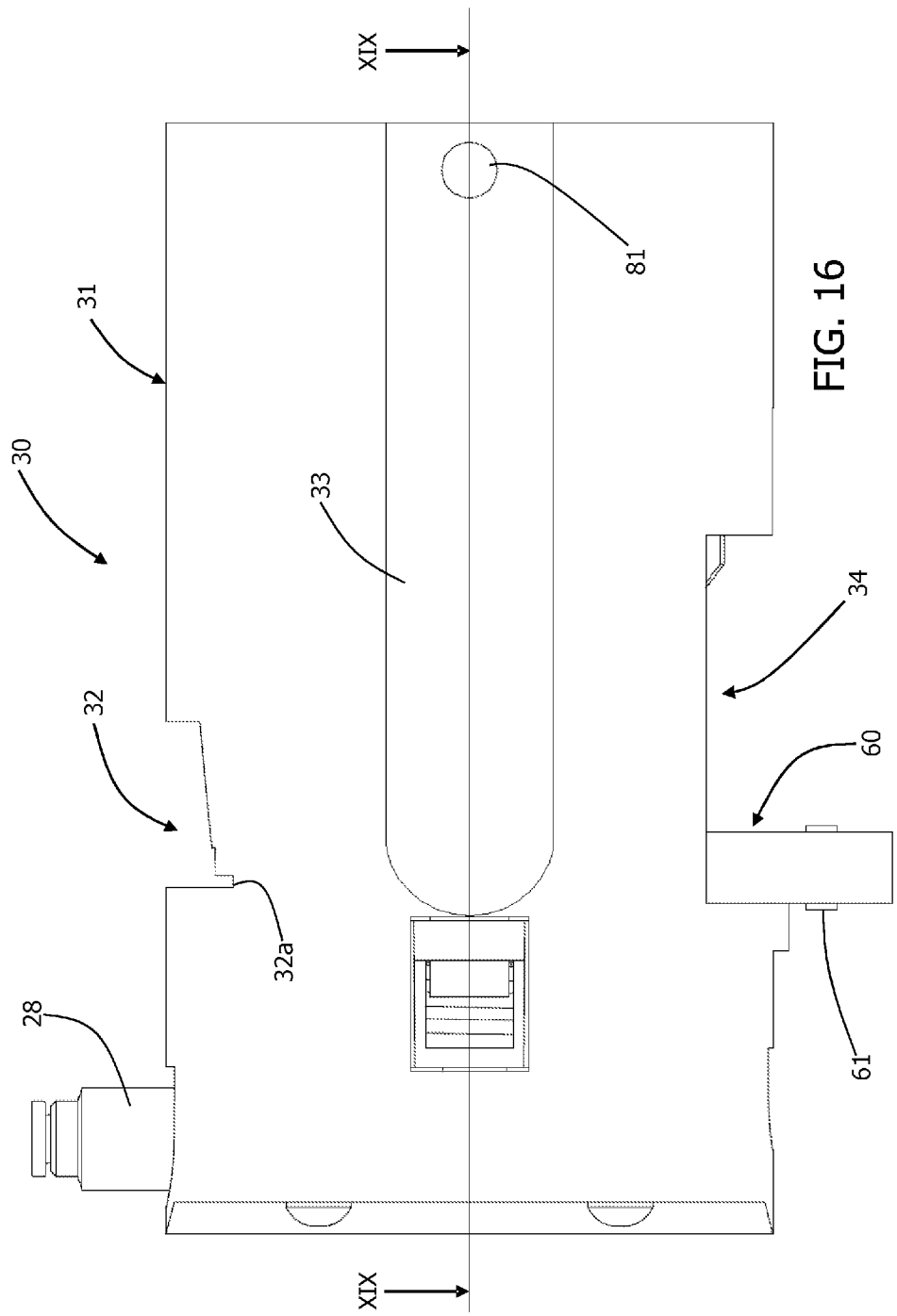
Figure 17:
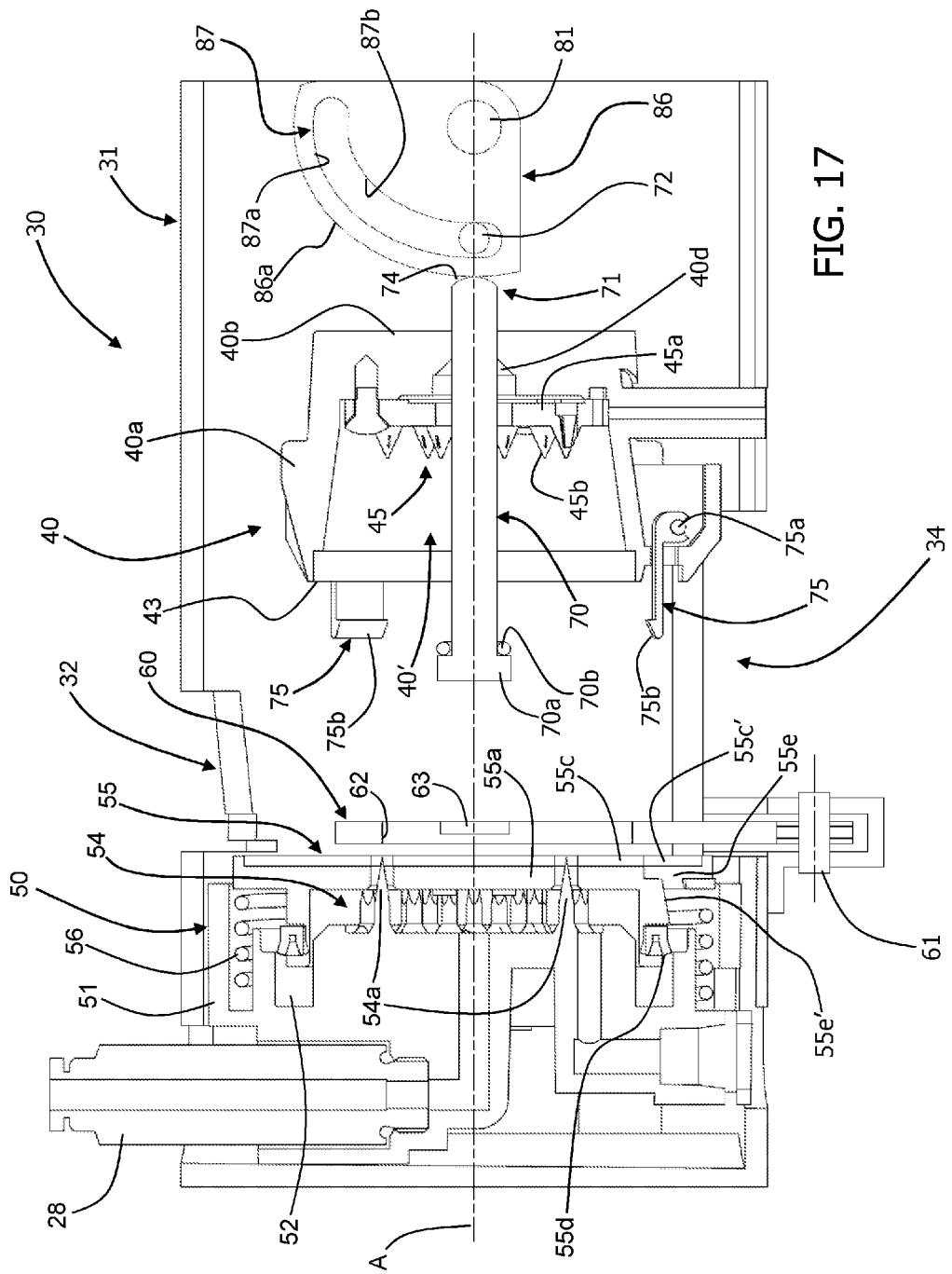
FIGS. 17 and 18 are sections according to the line XVIII-XVIII of FIG. 15, respectively without and with a capsule inserted in the assembly.
Figure 18:
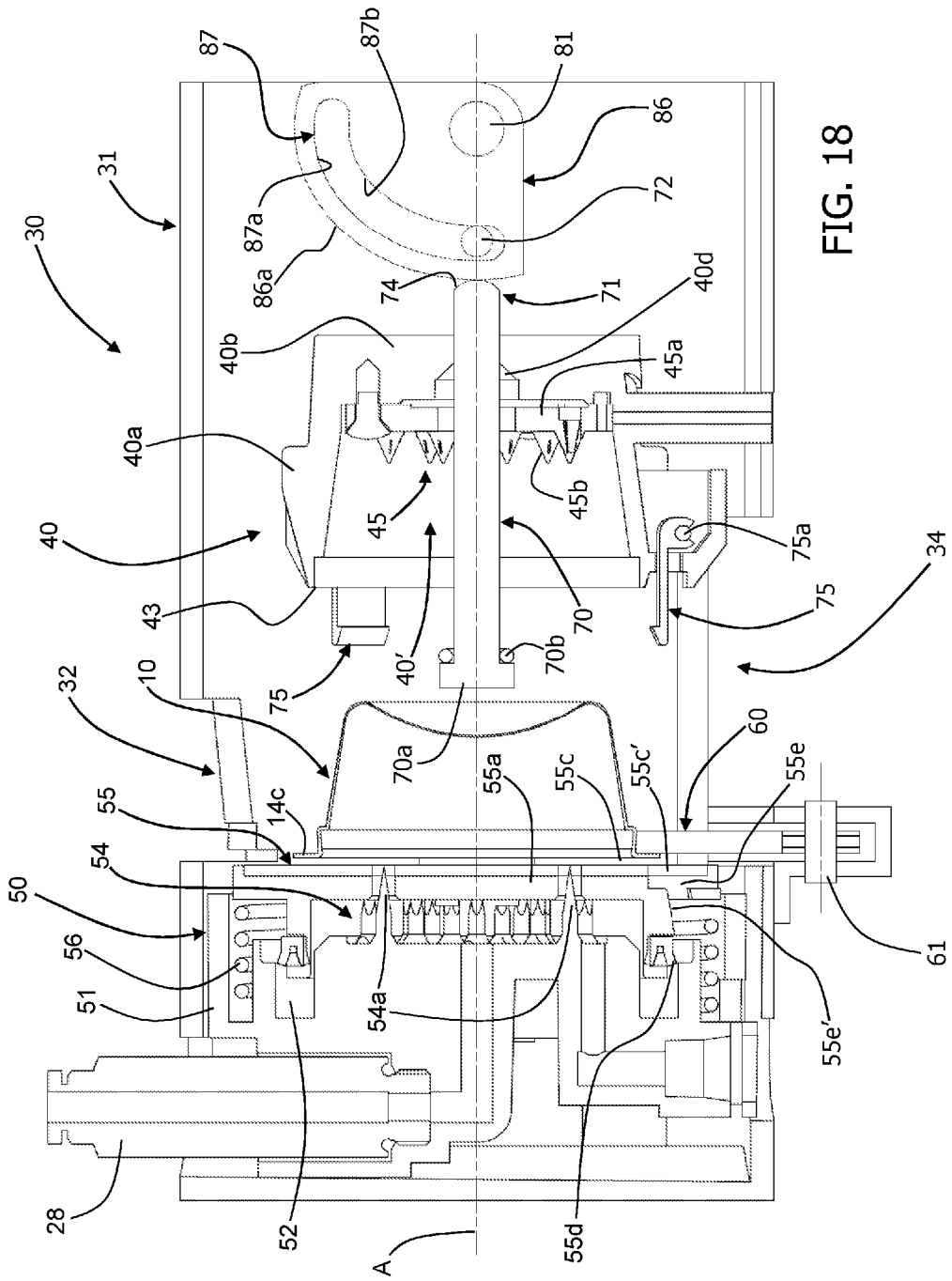
Figure 19:
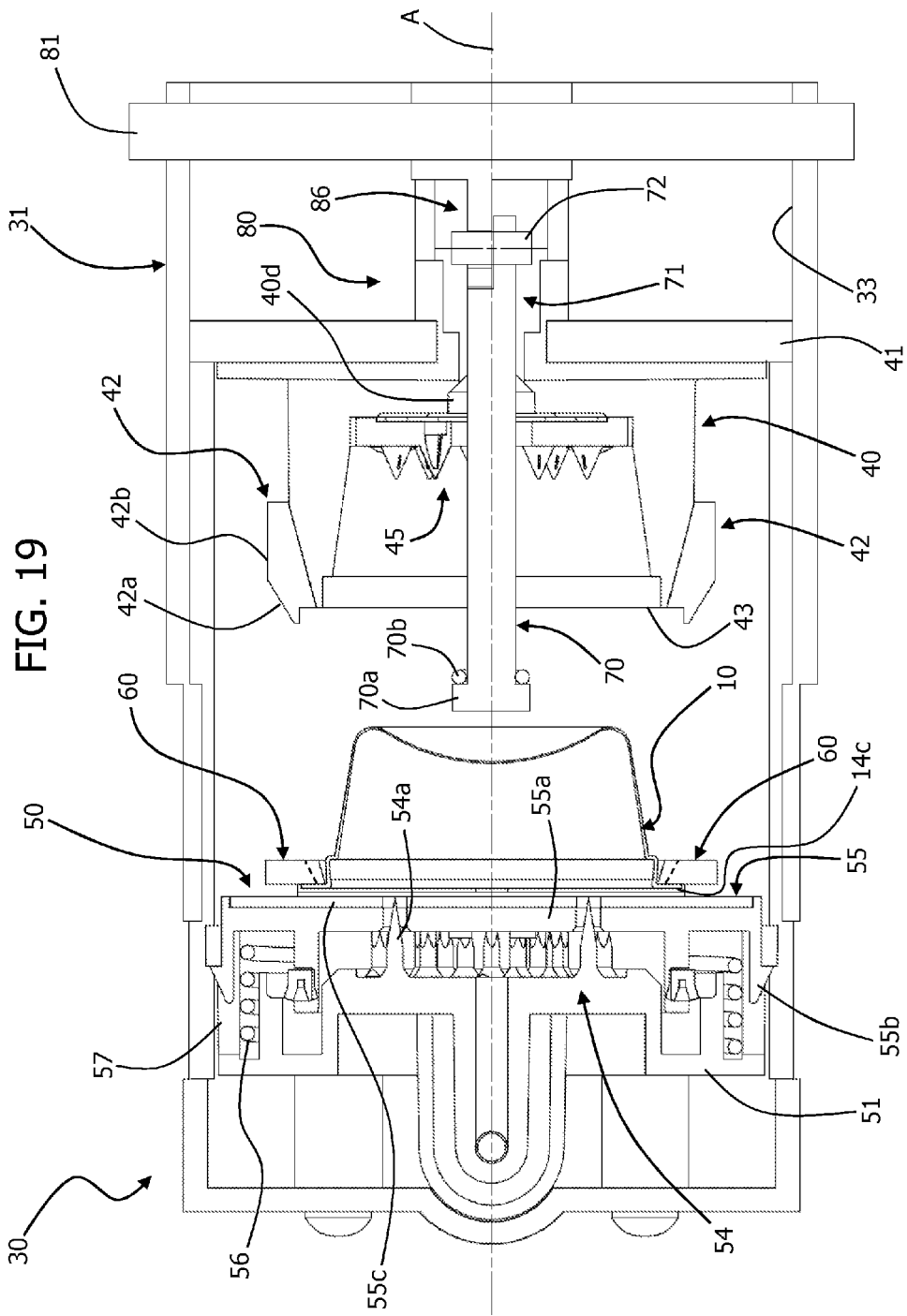
FIG. 19 is a cross section according to the line XIX-XIX of FIG. 16.
Figure 20:
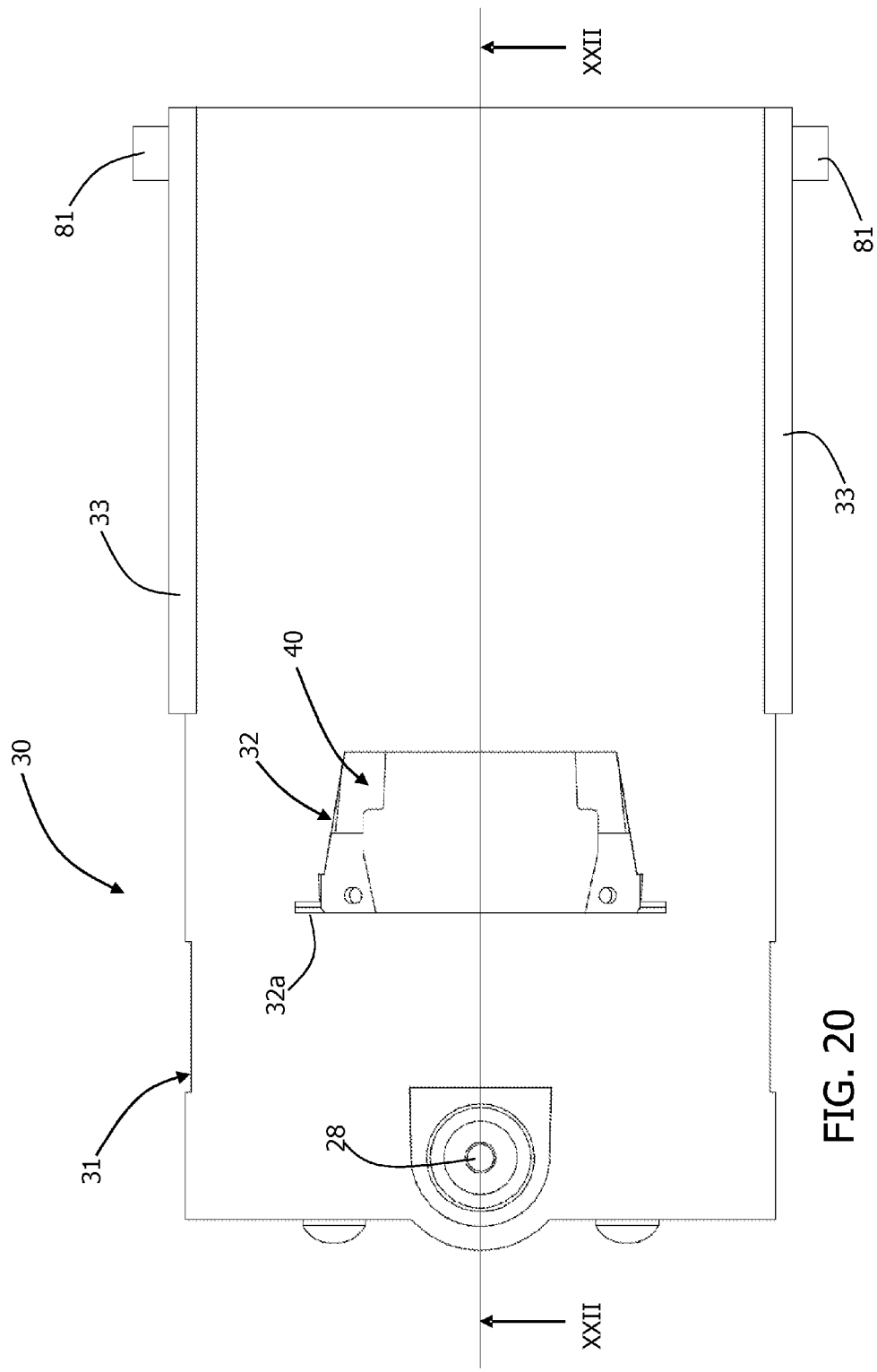
FIGS. 20 and 21 are views similar to those of FIGS. 15-16, but with the assembly in a second condition.
Figure 21:
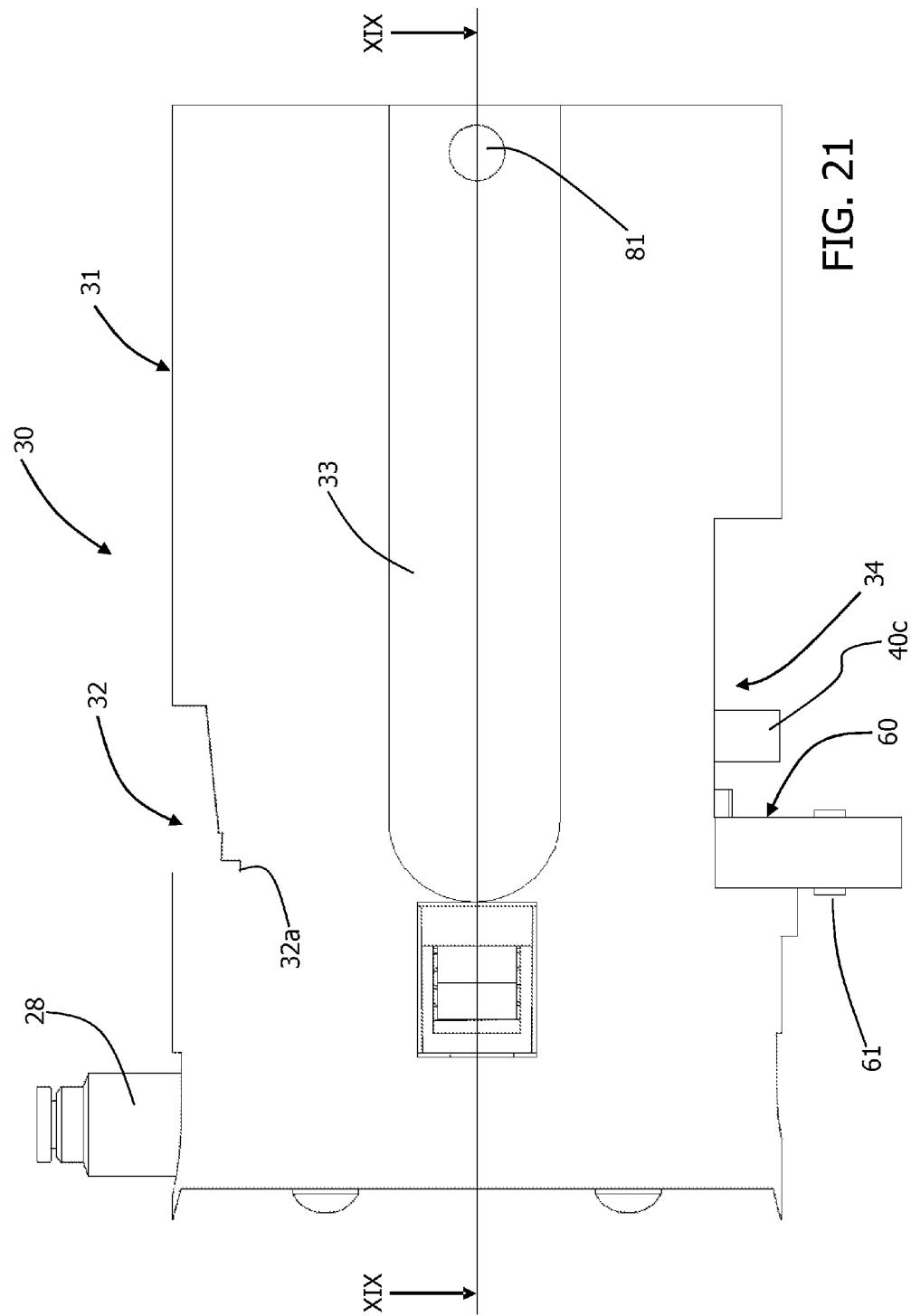

FIGS. 15 and 16 illustrate the assembly 30 in top plan view and side elevation, respectively, with the capsule holder 40 in the retracted position, whilst FIGS. 17-19 are sections of FIGS. 15-16 (FIG. 17 is a cross section similar to that of FIG. 18, but in the absence of a capsule loaded into the assembly 30). FIGS. 20-21 and 22-23 are similar to FIGS. 15-16 and 18-19, respectively, but with the capsule holder 40 in the advanced position.

As has already been seen, the assembly 30 has a loading arrangement, aimed at enabling guided insertion, from above, of a capsule 10. The aforesaid loading arrangement includes the upper inlet passage 32, which opens substantially in an area intermediate between the capsule holder 40 and the injector 50. The passage 32 is shaped and has dimensions such as to enable introduction of a capsule 10 in a direction of loading that is substantially vertical and perpendicular to the axis A (see arrow F2 in FIG. 3), with the corresponding wall 16 of the capsule facing the injector 50. On the side opposite to the inlet duct 32, the casing 31 has a lower outlet passage 34, for discharge from the assembly itself of the capsule 10, when exhausted. As already explained, the inlet passage 32 is shaped and has dimensions such as to guide a capsule 10 with relative precision up to a retention area; the outlet passage 34 preferably has dimensions larger than the inlet passage 32 to enable the capsule 10 to drop freely by gravity on the outside of the assembly 30.

FIGS. 17-19 illustrate a possible embodiment of an injector 50 that comprises a main body 51, which is stationary with respect to the casing 31 and is here provided with a perforation device, which may be of any known conception.

In the example shown, the body 51 has a cavity 52 that houses at least in part the aforesaid perforation device, designated by 54. The device 54 basically comprises one or more tips 54a—preferably an array of tips—facing the capsule holder 40 and substantially parallel to the axis A. The tips 54a may have a structure provided with at least one axial opening or axial groove in order to enable supply of the pressurized fluid within a capsule 10, after perforation of its wall 16 (FIGS. 1 and 2). Irrespective of the specific conformation of the body 51 and of the device 54, the arrangement is such that the pressurized fluid that is supplied by means of the duct 28 to the injector 50 can penetrate within the capsule after perforation of its wall 16. As already explained, in any case, the invention may be applied also to the case of dispensing units provided for capsules having a pre-perforated closing wall or for pods made of filter paper, in which case the presence of the perforation device 54 is not necessary.

Once again with reference to the non-limiting example illustrated, the cavity 52 is closed at the front by a closing member 55, coaxial with the axis A, and defined hereinafter for simplicity as "plate". The plate 55 is provided with holes (not indicated) aligned or substantially coaxial with the tips 54a, and can slide towards the inside of the cavity 52, countering the elastic reaction of a spring 56. For this purpose, defined in the injector 50 is a seat for housing one end of the spring 56, the other end of which bears upon the body of the plate 55.

In the embodiment exemplified, the plate 55 has a body substantially shaped like a disk, in particular shaped like a lobed disk, having a front wall 55a, provided with the holes for the tips 54a, and rear appendages 55b (FIG. 19), provided with end teeth engaged in corresponding linear guides 57 defined in the peripheral wall of the body 51. The front face of the wall 55a is covered by a fluid-tight element or gasket 55c, which is also provided with holes for the tips 54a of the perforation device 54. Preferentially, provided on the rear face of the wall 55a is an annular gasket 55d, designed to provide a fluid-tight seal in regard to a central area of the body 51.

In the embodiment exemplified, the body of the plate 55 is shaped for defining passages or recesses, one of which is designated by 55e in FIG. 17, which extend substantially on the outer edge of the wall 55a, the recesses being in axial positions corresponding to those of the coupling members 75 of the capsule holder 40. Each of the above recesses 55e preferably defines a respective inclined plane, designated by 55e' for example in FIG. 17. At the aforesaid front recesses of the plate 55, the gasket 55c is provided with corresponding slits or windows, designated by 55c' once again in FIG. 17.

The rear appendages 55b of the plate, in addition to preventing the plate itself from sliding out at the front, are preferentially sized and positioned in such a way that the front surface of the plate is held by the spring 56 in an advanced position. In order to enable disassembly of the plate 55 from the main body 51, the appendages 55b and the corresponding guides 57 may form part of a bayonet coupling.

The dimensions of the plate 55 with the corresponding appendages 55b, of the body 51 with corresponding cavities 52 and guides 57, as well as of the tips 54a of the perforation device 54, are such that, when at rest, the plate 55 is held by the spring 56 in the aforesaid advanced position (FIGS. 17-19), in which each tip 54a engages, or is substantially coaxial to, a respective hole of the wall 55a and of the front gasket 55c of the plate, but without substantially coming out therefrom. As will be seen hereinafter, instead, in a position of infusion or preparation of the liquid product, the thrust on the plate 55 exerted by a capsule 10 causes the perforation device 54 to come to assume an operative or extracted condition, in which its tips 54a project from the holes of the plate 55, following upon a recession of the latter towards the inside of the cavity 52, countering the elastic reaction of the spring 56.

As mentioned, in any case, the injector 50 may be provided with a perforation device of some other type, and not necessarily provided with tips, there possibly being sufficient also reliefs which are designed to bring about tearing of the wall 16 of the capsule 10.

Once again FIG. 17 shows how to the bottom wall 40b of the capsule holder there may be associated a perforation device 45, which is internal to the housing 40' and comprises, for example, a supporting wall 45a, preferably mounted at a distance from the wall 40b, has a central through opening and carries one or more tips 45b preferably an array of tips facing the inside of the capsule holder 40, in a direction substantially parallel to the axis A. The tips 45b may have a structure provided with one or more axial openings or grooves, designed to enable outflow of the liquid product prepared using the capsule 10. Irrespective of the specific conformation of the aforesaid tips, the arrangement is such that the liquid that flows out of the capsule 10, perforated or torn at the bottom by the tips 45b, can reach the passage 40c.

Also partially visible in FIG. 17 are the retention means, i.e., one of the jaws 60, with the corresponding bottom hingepin 61, the seat 62, and an intermediate lead-in 63.

Also visible in FIG. 19 is a different conformation of the parts or elements 42, aimed at enabling divarication of the jaws 60. These elements 42, configured as parts applied to or defined integrally in the body of the capsule holder 40, define a front inclined plane 42a and a preferably plane upper surface 42b.

The loading arrangement of the dispensing assembly 30 is configured to receive the capsule 10 from above, through the inlet passage 32, and then keep it in the retention position via the jaws 60, so that it substantially shares the axis A, between the capsule holder 40 and the injector 50, with the corresponding wall 16 substantially in contact with, or slightly set apart from, the plate 55, i.e., its front gasket 55c.

In the loading phase, with the actuation linkage in the initial position (FIGS. 17-19), the capsule holder 40 is in the respective retracted (backward) loading position, i.e., set at a distance from the injector 50.

The capsule 10 introduced into the passage 32 with slight thrust determines a divarication of the jaws and drops until its part set behind the flange 14c penetrates into the seat 62 defined between the jaws themselves, as may be seen in FIG. 19; in this embodiment, the jaws 60 elastically withhold the capsule, for example countering the action of corresponding springs. The capsule 10 is supported in a loading or withholding position, in which the capsule itself is generally coaxial with the axis A, with the wall 16 close to the front surface of the plate 55, i.e., its gasket 55c.

The cycle of operation of the machine then envisages actuation of the linkage 80, as previously described, which brings about progressive advance of the capsule holder 40 towards the injector 50.

At a certain point of advance of the capsule holder 40 towards the injector 50, the inclined plane 42a of the elements 42 comes into contact with the lead-in 63 (FIG. 17) of the jaws 60: note that in this step the capsule 10 is already partially introduced into the capsule holder 40. As this movement proceeds, then, progressive divarication or opening of the jaws 60 is brought about, as well as progressive entry of the capsule 10 into the housing 40' of the capsule holder. Since the capsule 10 is already partially received into the housing 40' and given the advanced condition of the plate 55, the capsule 10 cannot drop down.

When the inclined plane 42a of the elements 42 has traversed entirely the inclined plane 63, the jaws 60 are in the respective open condition and the plane surface 42b of the elements 42 can slide on an internal surface (i.e., facing the axis A) of the jaws themselves. In this way, as advance of the capsule holder 40 proceeds, the jaws 60 are kept in the aforesaid open condition, as may be seen for example in FIG. 23, where the capsule is no longer engaged in the seat of the jaws. As the capsule holder 40 continues to advance, the front edge 43 thereof comes into contact with the flange 14c of the capsule 10 so as to push it forcefully against the plate 55, with the capsule that cannot penetrate further into the chamber of the capsule holder.

Simultaneously with the steps described above, in the course of advance of the capsule holder 40, the front ends of the coupling members 75 and in particular the inclined plane of the corresponding teeth 75b comes at a certain point into contact with the annular flange 14c of the capsule 10. It should be noted that the position and dimensions of the elements involved (capsule 10, capsule holder 40, coupling members 75) are such that at the moment of contact between the coupling members 75 and the flange 14c of the capsule, the latter is already introduced for the most part into the housing 40'. It should likewise be noted that in these steps the conicity of the capsule 10 and of the housing 40' determines a sort of self-centring of the capsule itself with respect to the chamber and the injector.

Figure 22:
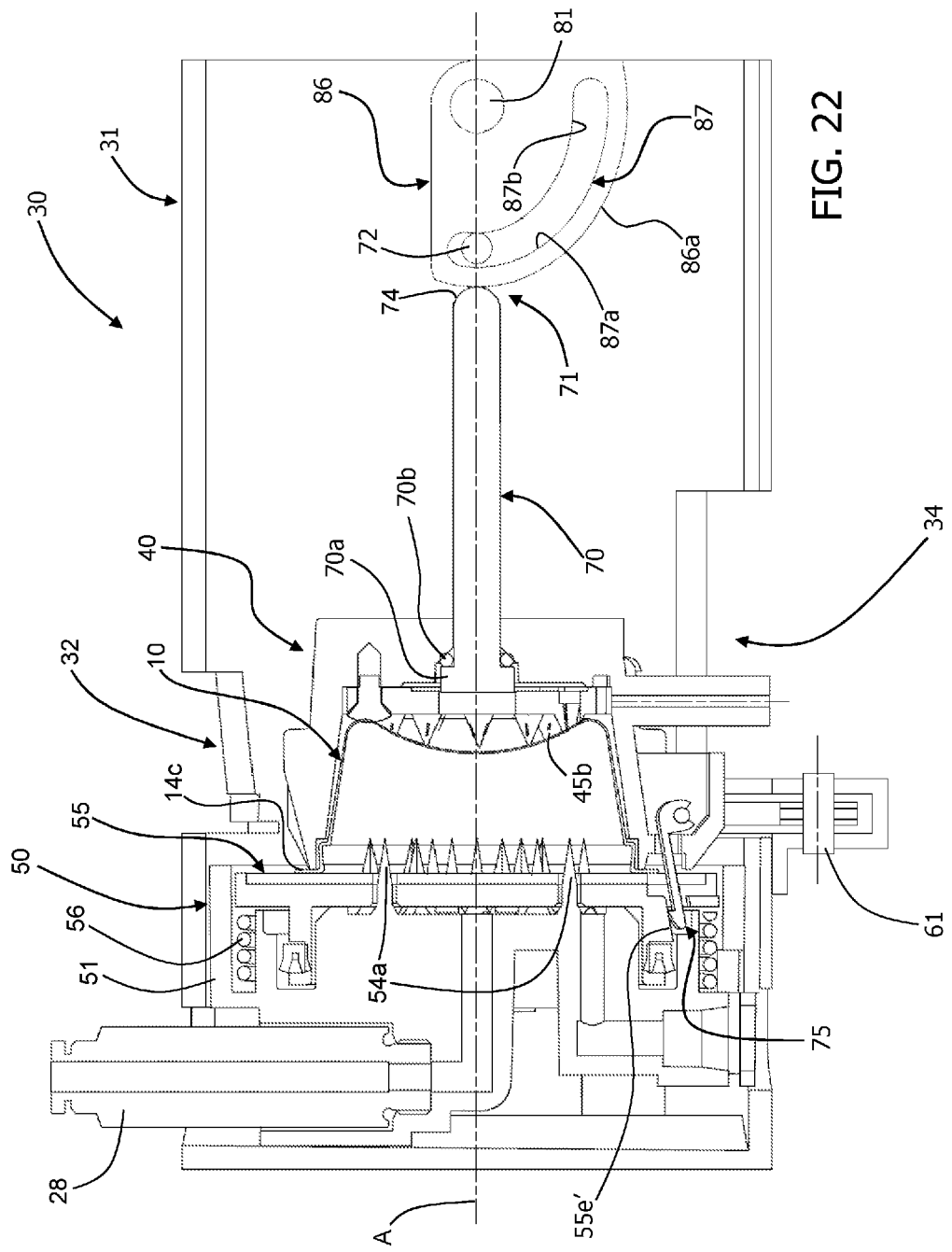
FIGS. 22 and 23 are sections according to the lines XXII-XXII and XXIII-XXIII of FIGS. 20 and 21, respectively.

As the capsule holder 40 proceeds in its advance, and after it has passed completely beyond the edge of the flange 14c of the capsule, the inclined plane of the teeth 75b of the coupling members 75 comes into contact with the inclined plane 55e' (FIG. 17) defined at the aforesaid recesses of the plate 55, and then slides thereon up to a final end-of-travel position, visible in FIG. 22, where the front of the capsule is set up against the gasket 55c of the plate 55, by means of the front edge 43 of the capsule holder 40.

Figure 23:
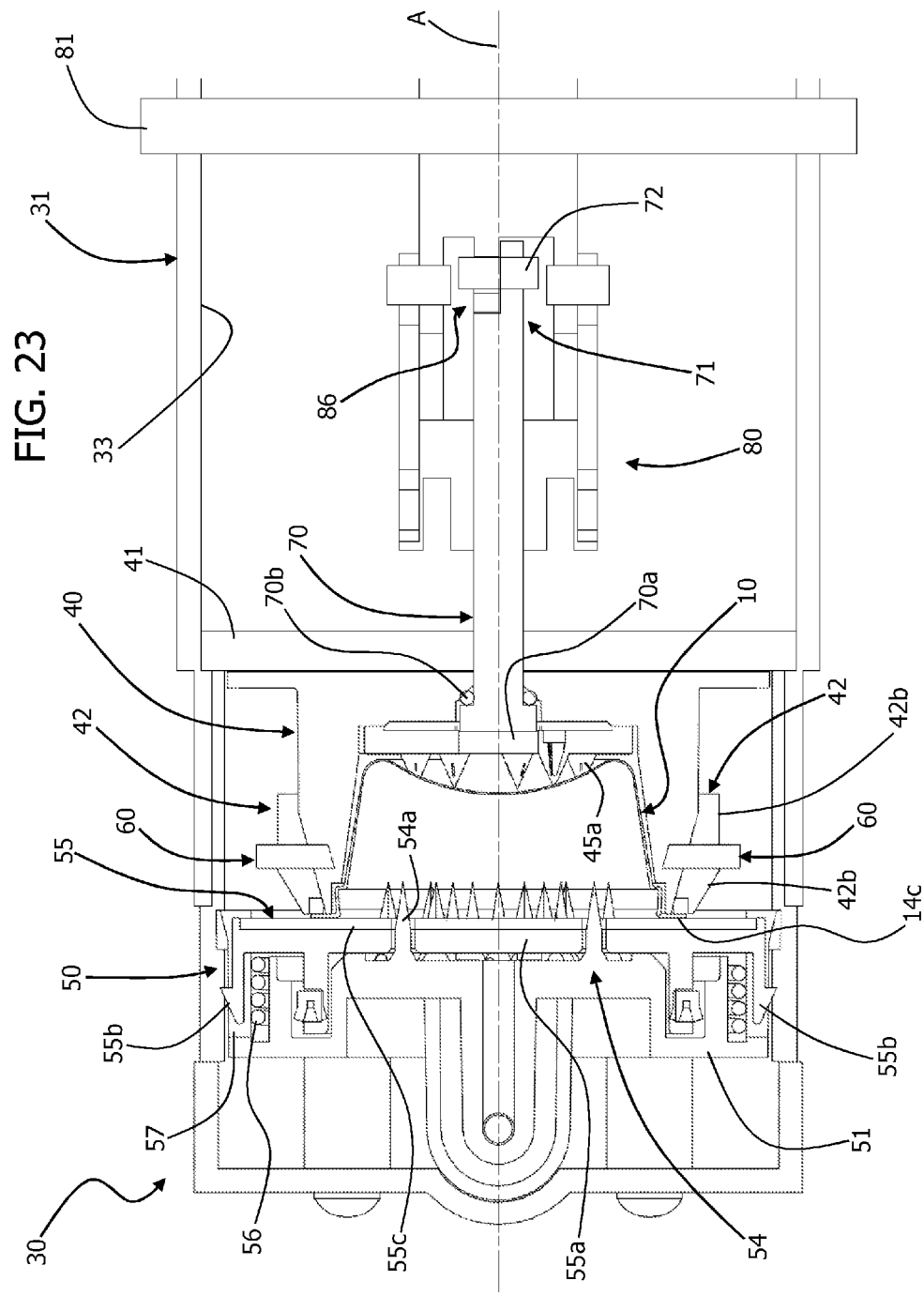

In various embodiments it may be envisaged that once the condition represented in FIGS. 22-23 is reached the peripheral region of the bottom wall of the capsule 10 bears upon a peripheral region of the wall 45a of the perforation device 45 not provided with tips (for example, in the case of the bottom wall with concavity as represented in FIG. 2) in such a way that the bottom of the capsule will not initially be perforated. In other embodiments, it may be envisaged that the bottom wall of the capsule comes up against the tips 45b of the perforation device 45 without this determining a substantial perforation or tearing of the bottom, or again that the bottom will come to be at a short distance from the aforesaid tips. This may be obtained by appropriately sizing the cup-shaped body of the housing 40', and in particular the height of its front edge 43 upon which the flange 14c of the capsule bears. In other embodiments it may again be envisaged that, upon reaching the position of arrest of the capsule 10 within the capsule holder 40, the bottom of the former is already perforated by the tips 45b of the perforation device 45. As has moreover been said, in the case of an assembly 30 for pre-perforated capsules, it is not necessary to envisage the perforation device 45.

As has been said, irrespective of the practical implementation chosen, at a certain point of advance, the capsule 10 cannot penetrate further into the capsule holder 40. The capsule holder 40 in any case continues to advance, and this causes yielding of the spring 56 inside the injector 50, and hence recession of the plate 55 bearing upon the lamina 16 of the capsule 10. This recession, and the simultaneous advance of the capsule holder 40, has as consequence that the tips 54a of the perforation device 54 of the injector 50 come out of the corresponding holes of the plate 55 and then perforate the lamina of the capsule as far as the position of maximum advance of the capsule holder 40, visible in FIGS. 22-23. Once this position has been reached, the actuation system 80 has reached the end-of-travel position of advance.

As explained previously, even though the stem 70 is constrained via an articulated connection to the actuation system 80, and in particular to the shaft 81, actuation of the latter does not bring about a substantial displacement of the stem 70. With advance of the capsule holder 40, there is thus obtained a progressive approach of the front end of the stem 70 to the bottom wall 40b of the capsule holder 40, up to a position of minimal encumbrance of the stem 70 in the housing 40', as may be seen in FIGS. 22-23. As may be noted, in this condition, a widened front end or flange 70a of the stem 70 is inserted in a corresponding seat defined on the bottom 40b of the chamber, coaxial to the passage of the stem 70 (this seat is designated by 40d only in FIGS. 17-18), with the front part of the flange 70a that is preferentially substantially flush with the supporting wall 45a of the perforation device 45 inside the capsule holder 40. Conveniently, operative between the flange 70a and a surface of the seat 40d is a fluid-tight element 70b, such as an annular gasket, designed to prevent leakage of liquid towards the inside of the passage in which the stem 70 slides.

When the actuation system 80 has been brought into the position of FIGS. 22-23, the pump 23 of FIG. 1 is actuated. The hot water and/or steam under pressure is thus forced into the capsule 10, through the tips 54a of the perforation device 54, to obtain infusion with the powdered product (coffee, in the example considered) contained in the capsule 10. In this step, the front gasket 55a of the plate 55 improves the fluid-tightness in regard to the sealing lamina 16 of the capsule, in the course of introduction into the latter of water and/or steam under pressure. In the case where the bottom of the capsule 10 had already been perforated previously by the tips 45b of the perforation device 45, the liquid product generated by the infusion can flow out through the passage 40c towards a collection receptacle. Other embodiments and as already mentioned above may envisage, instead, that, at the start of injection of hot water and/or steam under pressure into the capsule 10, the bottom of the latter has not yet been perforated. In theses embodiments, at a certain point subsequent to start of injection of hot water and/or steam, the pressure that is set up inside the capsule 10 causes its bottom to start to be deformed and pushed against the tips or reliefs 45b of the perforation device 45, until perforation or tearing is obtained that enables outflow of the liquid product towards the duct 40c. As has been said, on the other hand, one or both of the perforating devices may not be present in the case of pre-perforated capsules.

The pump 23 that sends the hot water under pressure into the capsule 10 is then de-activated, for example manually. Next, the actuation system 80 may be operated to bring the capsule holder 40 back into the initial position of FIGS. 17-19.

With recession of the capsule holder 40, there is obtained sliding of the divaricator elements 42 with respect to the jaws 60, in a direction opposite to the one described previously, and recession of the coupling members 75. Shortly after start of recession, then, the teeth 75b of the coupling members 75 go back into contact with the front part of the flange of the capsule 10 (i.e., the part thereof covered by the lamina 16). Following upon this engagement, then, and as recession of the capsule holder 40 proceeds, the lamina of the capsule is slid out of the tips 54a of the perforation device 54 of the injector 50 (when the device 54 is present), or in any case progressively retracted with respect to the body of the injector 50, accompanied in this by the plate 55, thanks to the action of the corresponding spring 56.

Also in the case where the capsule 10 had remained stuck right down, with interference, in the capsule holder 40, recession of the latter brings about progressive recession of the capsule from the injector.

In this step, the jaws 60 are in any case still kept in a divaricated condition by the elements 42 of the capsule holder 40. In this way, the flange 14c of the exhausted capsule cannot be withheld by the jaws 60. In practice, then, the arrangement is such that when, as the action of divarication performed by the elements 42 ceases, the jaws 60 re-close the flange of the capsule 10, in its movement of recession, has already passed beyond the jaws themselves.

Also in the course of recession of the capsule holder 40, as has been seen, the stem 70 remains substantially motionless. At a certain point of recession, then, the bottom of the capsule 10 will be pressed against the front end 70a of the stem 70, with the capsule that is pushed towards the outside of the capsule holder 40, thereby also causing extraction of the tips 45*b* of the perforation device 45 from the bottom of the exhausted capsule (when the above perforation device is present). The thrust exerted in this way by the stem 70 on the bottom of the capsule 10 is such as to overcome also a possible marked mechanical interference between the body of the capsule and the internal surface of the capsule holder 40, as well as between the possible tips 45*b* and the bottom of the capsule. In the course of recession of the capsule holder 40 (and hence of controlled advance of the capsule therein, thanks to the action of the stem 70) the flange 14*c* of the capsule is pressed against the teeth 75*b* up to the point of causing divarication of the coupling members 75, which can then re-close elastically after the flange has passed beyond the teeth in its movement of advance. When the flange 14*c* is no longer stopped by the members 75, the capsule occupies a position suitable for dropping into the underlying discharge passage 34. The assembly 30 has thus returned to the initial condition illustrated in FIG. 17, ready to receive a new capsule 10.

It will be appreciated that the ejection arrangement of the assembly according to the invention enables precise and reliable extraction of an exhausted capsule 10 from the capsule holder 40, which is totally independent of the action of the retention members represented by the jaws 60. The arrangement described is extremely reliable and such as to guarantee ejection of a capsule even in the case of marked mechanical interference, which may occasionally occur between the capsule and the capsule holder, all this without it being necessary to provide springs for return of the stem or other elastic means or means for storing mechanical energy. The stem is always constrained to the mechanism 80 so that in no case is it free to displace autonomously.

Without prejudice to the principle of the invention, the details of construction and the embodiments may vary even significantly with respect to what has been illustrated herein purely by way of non-limiting example, without thereby departing from the scope of the invention, as defined by the annexed claims.

Finally, it will be appreciated that the functions of the ejection system described may be obtained also with mechanical couplings based upon the use of profiles different from the ones exemplified, provided that the condition of constraint of the ejector member 70 in the course of the movements of advance and recession of the capsule holder 40 is ensured, and without prejudice to the fact that, following upon advance of the capsule holder, the member 70 will assume a retracted position with respect to the bottom of the housing 40', or in any case such as not to interfere with insertion of the capsule into the chamber itself, whilst, following upon recession of the capsule holder, the member 70 will assume an advanced position with respect to the aforesaid bottom, or in any case such as to cause ejection of the capsule from the chamber.

The invention may be used also in the case of dispensing units with roto-translational movement of the corresponding capsule holder, for example of the type described in WO 2011/015978 A1, where an oscillating body functioning as contrast member may be replaced by a mechanical desmodromic connection suitably parameterized according to the teachings contained herein.

The invention claimed is:

1. A dispensing assembly for a machine for the preparation of beverages using capsules that have a body that houses a dose of at least one substance that is able to form a liquid product using a fluid, the dispensing assembly having:

an infusion chamber that comprises a first part and a second part, at least the first part defining a housing configured for receiving at least partially one said capsule;

an actuation linkage, operable to cause relative movements between the first part and the second part of the infusion chamber, between a spaced position and a close position;

ejector means, which are associated to the first part and capable to push the capsule towards the outside of the housing when the first part and the second part are brought towards their spaced position, wherein one of the first part and the second part is configured for introduction of the fluid into the capsule and the other of the first part and the second part is configured for dispensing the liquid product from the infusion chamber, and wherein the ejector means comprise an ejector member which is movable with respect to a bottom of the first part in such a way that:
  in the passage from said spaced position to said close position, the ejector member assumes a position with respect to the bottom of the first part such as not to interfere with the insertion of a capsule into the housing; and
  in the passage from said close position to said spaced position, the ejector member assumes a position with respect to the bottom of the first part such as to cause ejection of the capsule from the housing, wherein the ejector member is constrained to a movable element of the actuation linkage by means of a mechanical connection pre-arranged for controlling displacement of the ejector member both in the passage from said spaced position to said close position and in the passage from said close position to said spaced position, wherein the mechanical connection comprises:
  at least one cam member, connected in rotation to a shaft of the actuation linkage that is rotatable about to an axis perpendicular to a direction of displacement of the first part with respect to the second part;
  at least one cam follower associated to the ejector member, wherein the cam member has at least one cam surface defined in a parametric way as a function of a programmed displacement of the ejector member, and wherein the cam member has at least two said cam surfaces and the cam follower is configured to co-operate with one of said cam surfaces in the course of displacement from said spaced position to said close position and to co-operate with the other of said cam surfaces in the course of displacement from said close position to said spaced position.

2. The dispensing assembly according to claim 1, wherein the mechanical connection is a desmodromic connection, comprising at least one connection member angularly movable with said movable element of the actuation linkage.

3. The dispensing assembly according to claim 1, wherein the mechanical connection is configured in such a way that, in the passage between said spaced position and said close position, the ejector member remains substantially stationary or else performs slight forward or backward displacements.

4. The dispensing assembly according to claim 1, wherein the ejector member is longitudinally extended and slidably mounted in a through opening of the bottom of the first part.

5. The dispensing assembly according to claim 1, wherein the ejector member has a front end capable to interfere with a bottom of the capsule when the capsule is at least partially inserted in the housing of the first part, said front end being able to assume, with respect to the bottom of the first part, a retracted position and an advanced position, passage from the retracted position to the advanced position, and vice versa, being caused by a displacement of the first part from said close position to said spaced position where it is set at a distance, and vice versa.

6. The dispensing assembly according to claim 1, further comprising coupling means carried by the first part, the coupling means being designed to assume a condition of engagement and a condition of disengagement with respect to a capsule in the course of the displacement towards said close position and towards said spaced position, respectively.

7. The dispensing assembly according to claim 6, wherein the coupling means are switchable from the condition of engagement to the condition of disengagement following upon a thrust towards the outside of the housing exerted on the capsule by the ejector member.

8. A machine for the preparation of beverages using capsules, comprising a dispensing assembly according to claim 1.

9. A system for the preparation of beverages, comprising:
a machine for the preparation of beverages that includes a dispensing assembly according to claim 1; and
a capsule containing a dose of at least one substance that is able to form a beverage using a fluid.

10. A method for the preparation of beverages comprising the steps of:
providing a machine for the preparation of beverages comprising a dispensing assembly according to claim 1;
providing a capsule containing a dose of at least one substance that is able to form a liquid product using a fluid;
inserting the capsule in the dispensing assembly when the first part and the second part are in the spaced position;
operating the actuation linkage for displacing the first part and the second part into the close position;
with the first and second parts in the close position, injecting the fluid into the capsule in order to prepare the beverage and dispensing the beverage;
bringing the first and second parts back into the spaced position;
wherein, in the course of displacement from the close position to the spaced position, a front end of the ejector member interferes with a bottom of the capsule, for pushing the capsule towards the outside of the first part;
and wherein the displacement of the ejector member is controlled in both of its directions of displacement by a mechanical connection that constrains the ejector member to a movable element of the actuation linkage.

11. A dispensing assembly for a machine for the preparation of beverages using capsules that have a body that houses a dose of at least one substance that is able to form a liquid product using a fluid, the dispensing assembly having:
a supporting structure, having an upper side and a lower side opposite to each other, and two longitudinal sides opposite to each other, the upper side of the supporting structure having an inlet passage for introducing one said capsule into the supporting structure in a loading direction, and the lower side having an outlet passage for discharging the capsule out of the supporting structure in an unloading direction;
an infusion chamber that is located within the supporting structure and comprises a first part and a second part, at least the first part defining a housing configured for receiving at least partially the capsule;
an actuation linkage, operable to cause relative movements between the first part and the second part of the infusion chamber, between a spaced position enabling introduction of the capsule in the supporting structure, and a close position enabling injection of the fluid into the capsule and dispensing of the liquid product from the infusion chamber;
ejector means, which are associated to the first part and capable to push the capsule towards the outside of the housing when the first part and the second part are brought towards their spaced position,
wherein one of the first part and the second part is configured for injection of the fluid into the capsule and the other of the first part and the second part is configured for dispensing the liquid product from the infusion chamber,
wherein the ejector means comprise an ejector member which is movable with respect to a bottom of the first part in such a way that:
in the passage from said spaced position to said close position, the ejector member assumes a position with respect to the bottom of the first part such as not to interfere with the insertion of a capsule into the housing; and
in the passage from said close position to said spaced position, the ejector member assumes a position with respect to the bottom of the first part such as to cause ejection of the capsule from the housing,
wherein the second part is mounted stationary within the supporting structure and the first part is constrained within the supporting structure for moving linearly between the spaced position and the close position, the first part and the second part being coaxial to each other in said spaced position and in said close position;
wherein each of the longitudinal sides of the supporting structure has a linear guide, engaged in which is a corresponding lateral guide element of the first part, in such a way that the actuation linkage is operable to cause linear displacements of the first part along an axis of actuation between the spaced position and the close position, the axis of actuation being transverse to the loading and unloading directions;
wherein the dispensing assembly further comprises retention members arranged within the supporting structure between the inlet passage and the outlet passage, the retention members being able to assume an operative condition and an inoperative condition, in the operative condition the retention members retaining the capsule loaded via the inlet passage in a position intermediate to the first part and the second part, when the first part and the second part are in the spaced position, and in the inoperative condition the retention members releasing the capsule when the first part linearly moves towards the spaced position, after dispensing of the liquid product from the infusion chamber;
wherein the ejector member is constrained to a movable element of the actuation linkage by means of a mechanical connection pre-arranged for controlling displacement of the ejector member both in the passage from said spaced position to said close position and in the passage from said close position to said spaced position, in such a way that, during linear displacement of the first part from the close position to the spaced position and with the retention members in the inoperative condition, the ejector member forces the capsule outside the housing and the capsule is enabled to drop by gravity towards the outlet passage in the unloading direction.

12. The dispensing assembly according to claim 11, wherein the mechanical connection comprises:
- at least one cam member, connected in rotation to a shaft of the actuation linkage that is rotatable about to an axis perpendicular to a direction of displacement of the first part with respect to the second part;
- at least one cam follower associated to the ejector member, wherein the cam member has at least two cam surfaces and the cam follower is configured to co-operate with one of said cam surfaces during passage from said spaced position to said close position and to co-operate with the other of said cam surfaces during passage from said close position to said spaced position.

13. A dispensing assembly for a machine for the preparation of beverages using capsules that have a capsule body having an outwardly protruding flange and housing a dose of at least one substance that is able to form a liquid product using a fluid, the dispensing assembly having:
- an infusion chamber that comprises a first part and a second part, the first part having a front edge and defining a housing configured for receiving at least partially one said capsule, the second part having a front facing the first part;
- an actuation linkage, operable to cause relative movements between the first part and the second part of the infusion chamber, between a spaced position and a close position;
- ejector means, which are associated to the first part and capable to push the capsule towards the outside of the housing when the first part and the second part are brought towards their spaced position,
- wherein one of the first part and the second part is configured for introduction of the fluid into the capsule and the other of the first part and the second part is configured for dispensing the liquid product from the infusion chamber,
- and wherein the ejector means comprise an ejector member which is movable with respect to a bottom of the first part in such a way that:
  - in the passage from said spaced position to said close position, the ejector member assumes a position with respect to the bottom of the first part such as not to interfere with the insertion of a capsule into the housing; and
  - in the passage from said close position to said spaced position, the ejector member assumes a position with respect to the bottom of the first part such as to cause ejection of the capsule from the housing,
- wherein the ejector member is constrained to a movable element of the actuation linkage by means of a mechanical connection pre-arranged for controlling displacement of the ejector member both in the passage from said spaced position to said close position and in the passage from said close position to said spaced position,
- wherein the dispensing assembly further comprises coupling members carried by the first part, each coupling member having a front portion which projects at the front of the first part beyond the front edge thereof and is designed to assume a condition of engagement with respect to the flange of the capsule body, when the first part and the second part are in the closed position, and a position of disengagement with respect to the flange of the capsule body, in the course of a relative movement between the first part and the second part towards the spaced position,
- in such a way that, during said relative movement towards the spaced position, the capsule is progressively retracted with respect to the front of the second part by the front portion of the coupling members and thereafter the ejector member forces the capsule outside the housing of the first part, causing thereby also passage of the front portion of the coupling members from the condition of engagement to the condition of disengagement with respect to the flange of the capsule body.

14. The dispensing assembly according to claim 13, wherein the mechanical connection comprises:
- at least one cam member, connected in rotation to a shaft of the actuation linkage that is rotatable about to an axis perpendicular to a direction of displacement of the first part with respect to the second part;
- at least one cam follower associated to the ejector member, wherein the cam member has at least two cam surfaces and the cam follower is configured to co-operate with one of said cam surfaces during passage from said spaced position to said close position and to co-operate with the other of said cam surfaces during passage from said close position to said spaced position.

15. The dispensing assembly according to claim 13, wherein the front portion of each coupling member has a tooth adapted to engage with the flange of the capsule body.

16. The dispensing assembly according to claim 13, wherein the front edge of the first part is an annular front edge and the coupling members comprise three coupling members arranged around said annular front edge at approximately at 120° from one another.

17. The dispensing assembly according to claim 13, wherein the second part is mounted stationary within the supporting structure and the first part is constrained within the supporting structure for moving linearly between the spaced position and the close position, in such a way that the actuation linkage is operable to cause linear displacements of the first part along an axis of actuation between the spaced position and the close position.

* * * * *